United States Patent [19]

Miller et al.

[11] Patent Number: 4,889,616

[45] Date of Patent: Dec. 26, 1989

[54] OCTANE BOOSTING

[75] Inventors: James G. Miller, Pearl River; Regis J. Pellet, Croton; Edwar S. Shamshoum, Lake Peekskill; Jule A. Rabo, Armonk, all of N.Y.

[73] Assignee: UOP, Des Plaines, Ill.

[21] Appl. No.: 261,581

[22] Filed: Oct. 24, 1988

Related U.S. Application Data

[62] Division of Ser. No. 58,241, Jun. 4, 1987, Pat. No. 4,803,185.

[51] Int. Cl.$^4$ ............................................. C10G 11/04
[52] U.S. Cl. .................................... 208/114; 208/120
[58] Field of Search ....................... 208/114, 120, 113

[56] References Cited

U.S. PATENT DOCUMENTS

| | | | |
|---|---|---|---|
| 4,512,875 | 4/1985 | Long et al. | 208/114 |
| 4,744,885 | 5/1988 | Messina et al. | 208/114 |
| 4,752,651 | 6/1988 | Kaiser | 585/640 |
| 4,764,269 | 8/1988 | Edwards et al. | 208/120 |
| 4,765,884 | 8/1988 | Walker et al. | 208/114 |
| 4,789,535 | 12/1988 | Flanigen et al. | 208/114 |
| 4,803,185 | 2/1989 | Miller et al. | 502/64 |
| 4,814,316 | 3/1989 | Pellet et al. | 208/114 |

*Primary Examiner*—Anthony McFarlane
*Attorney, Agent, or Firm*—Vincent J. Vasta, Jr.

[57] ABSTRACT

The invention provides petroleum cracking and octane boosting catalysts containing a composite of an intermediate pore NZMS in combination with another non-zeolitic molecular sieve having the same frame work structure, and to processes for cracking of petroleum for the purpose of enhancing the octane rating of the gasoline produced.

10 Claims, 2 Drawing Sheets

OCTANE BOOSTING

This application is related to copending applications, Ser. Nos. 07/058,259, 07/058,275 and (Attorney docket Nos. D-15,444 and D-15, 444-1, and D-15,444-3, respectively), commonly assigned and filed on date herewith.

BRIEF SUMMARY OF THE INVENTION

The invention is directed to providing an octane boosting catalyst containing a composite of an intermediate pore non-zeolitic molecular sieve (NZMS) in combination with another non-zeolitic molecular sieve having the same framework structure, a combination of the octane boosting catalyst with a catalytic cracking catalyst, and to the cracking of petroleum fractions for the purpose of boosting the octane rating of the gasoline produced.

DETAILED DESCRIPTION OF THE INVENTION

Background to the Invention

Prior Art

Figure 1:
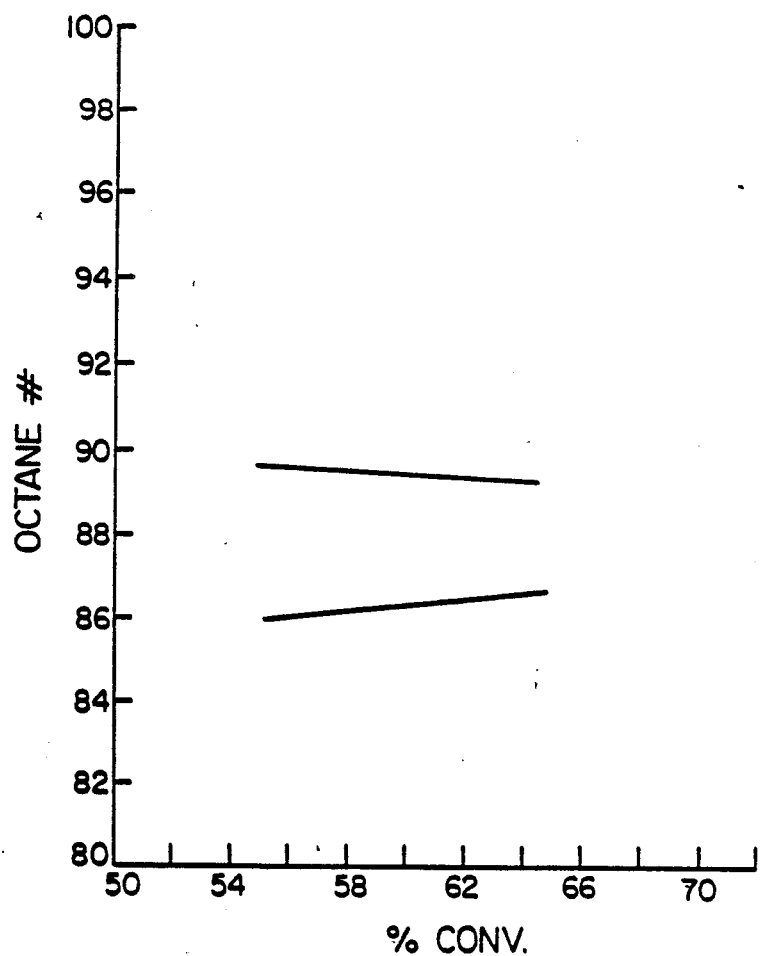
FIG. 1 shows the advantage of an octane boosting catalyst of the invention over a conventional NZMS catalyst in respect to octane number versus MAT conversion.

There is a phenomenon in heterogeneous catalysis characterized as tortuous diffusion. It involves the passage of gaseous or liquid reactant and reaction product(s) in the porous network of a solid heterogenous catalyst. Tortuous diffusion contemplates contact of the gaseous or liquid reactant and reaction products(s) with the catalytic agent in the porous network of the catalyst for a period longer than the prescribed residence time of the reactants and reaction product(s) in the bed of the catalyst. The length of contact time of the reactants and the reaction product(s) within the catalyst is dependent on the complexity of the porosity and the size of the pores. Catalysts with the high surface areas provide a substantial porosity and the reactants or reaction product(s) have a relatively lengthy stay within the catalyst, longer that the calculated residence time. If tho reactants and/or the reaction products are capable of generating undesirable products with such passage of time, then a considerable drop in the efficiency of the reaction will occur. One way to avoid the adverse effects of tortuous diffusion is to create a catalyst with low surface area, that is a solid catalyst which has relatively few pores and a significant number of them are large. However, this cannot be effectively done with all catalysts. Some cannot be effective or exist as a low surface area structure.

There is described herein a novel multi-compositional catalyst which provides a structure for the unique control of the tortuous diffusion factor in the FCC process to the extent such relates to boosting the octane of gasoline. It comprises a special class of non-zeolitic molecular sieve catalysts which have immutable crystalline microporous structures.

Copending U.S. patent application Ser. No. 07/058,259 (attorney's docket no. 15,444) teaches a new class of molecular sieves based upon the compositing a microporous non-zeolitic molecular sieves (NZMSs) with either another microporous non-zeolitic molecular sieve (NZMS) or a zeolitic molecular sieve (ZMS), or a combination of them. Copending U.S. patent application Ser. No. 07/058,275 (attorney's docket no. 15,444-1) teaches the use of a composite of a NZMS-37, such as SAPO-37 molecular sieve, with another "faujasitic" molecular sieve. Both applications provide a detailed discussion of the prior art evolution of microporous non-zeolitic molecular sieves and molecular sieve composite formation as employed to make composites used in this invention; that discussion is incorporated herein by reference. Especially relevant is the description in Table A in each application. For the purpose of brevity, it is not reproduced herein.

Included as one of the composites encompassed by the invention of copending U.S. patent application Ser. No. 07/058,259 (attorney's docket no. 15,444) are those made to contain intermediate pore SAPOs, AlPO$_4$s, MeAPOs, MeAOPs, ELAPOs and ELAPSOs, as described in Table D of the Copending application. Illustrative of these intermediate pore structured NZMS are those characterized in the following table:

TABLE A

| | | | INTERMEDIATE PORE STRUCTURE NZMSs | | | |
|---|---|---|---|---|---|---|
| Structure Type | AlPO$_4$ | SAPO | MeAPO (Me = Co, Fe, Mg, Mn, Zn) | MeAPSO (Me = Co, Fe, Mg, Mn, Zn) | ELAPO (EL = As, Be, B, Cr, Ga, Ge, Li, V, Ti) | ELAPSO (EL = As, Be, B, Cr, Ga, Ge, Li, V, Ti) |
| 11 | X | X | X | X | X | X |
| 31 | X | X | X | X | X | X |
| 40 | X | X | X | X | X | X |
| 41 | X | X | X | X | X | X | p The NZMS-40 structures fit into an in between category of the large and intermediate pore size NZMSs, and for the purposes of this invention, they are herein regarded to be intermediate pore NZMSs. These NZMSs are microporous non-zeolitic molecular sieves and they are described in the various patents and patent applications set forth in Table A of the aforementioned copending applications filed on even date herewith. Illustrative of such descriptions are those for the SAPO compositional class of intermediate pore structure NZMSs set forth in U.S. Pat. No. 4,440,871, patented Apr. 3, 1987. Examples 15–22 characterize the structure of and methods for making SAPO-11, examples 51–53 characterize the structure of and methods for making SAPO-31, examples 46 and 47 characterize the structure of and methods for making SAPO-40, and example 54 characterize the structure of and methods for making SAPO-41. SAPO-11 is there characterized as a crystalline, microporous silicoaluminophosphate having a characteristic X-ray the d-spacings set forth in the following Table B:

TABLE B

| 2-Theta | d | Relative Intensity |
|---|---|---|
| 9.4–9.65 | 9.41–9.17 | m |
| 20.3–20.6 | 4.37–4.31 | m |

TABLE B-continued

| 2-Theta | d | Relative Intensity |
|---|---|---|
| 21.0–21.3 | 4.23–4.17 | vs |
| 22.1–22.35 | 4.02–3.99 | m |
| 22.5–22.9 (doublet) | 3.95–3.92 | m |
| 23.15–23.35 | 3.84–3.81 | m–s |

SAPO-31 is there characterized as a crystalline, microporous silicoaluminophosphate having a characteristic X-ray powder diffraction pattern which contains at least the d-spacings set forth in the following Table C:

TABLE C

| 2-Theta | d | Relative Intensity |
|---|---|---|
| 8.5–8.6 | 10.40–10.28 | m–s |
| 20.2–20.3 | 4.40–4.37 | m |
| 21.9–22.1 | 4.06–4.02 | w–m |
| 22.6–22.7 | 3.93–3.92 | vs |
| 31.7–31.8 | 2.823–2.814 | w–m |

SAPO-41 is there characterized as a crystalline, microporous silicoaluminophosphate having a characteristic X-ray powder diffraction pattern which contains at least the d-spacings set forth in the following Table D:

TABLE C

| 2-Theta | d | Relative Intensity |
|---|---|---|
| 13.6–13.8 | 6.51–6.42 | w–m |
| 20.5–20.6 | 4.33–4.31 | vs |
| 21.1–21.3 | 4.21–4.17 | m–s |
| 22.1–22.3 | 4.02–3.99 | m |
| 22.8–23.0 | 3.90–3.86 | w–m |
| 23.1–23.4 | 3.82–3.80 | w–m |

SAPO-40 is there characterized as a crystalline, microporous silicoaluminophosphate having a characteristic X-ray powder diffraction pattern which contains at least the d-spacings set forth in the following Table E:

TABLE D

| 2-Theta | d | Relative Intensity |
|---|---|---|
| 7.5–7.7 | 11.79–11.48 | VW–M |
| 8.0–8.1 | 11.05–10.94 | S–VS |
| 12.4–12.5 | 7.14–7.08 | W–VS |
| 13.6–13.8 | 6.51–6.42 | M–S |
| 14.0–14.1 | 6.33–6.28 | W–M |
| 27.8–28.0 | 3.209–3.18 | W–M |

The aforementioned specifications and the description in U.S. Pat. No. 4,440,871 provide an appropriate characterization of these intermediate pore structure SAPOs.

The term "intermediate pore" refers to the pore size as determined by standard gravimetric adsorption techniques in the art of the referenced crystalline molecular sieve between what is recognized in the art as "large pore" and "small pore," see Flanigen et al, in a paper entitled, "Aluminophosphate Molecular Sieves and the Periodic Table", published in the "New Developments in Zeolite Science and Technology" Proceedings of the 7th International Zeolite Conference, edited by Y. Murakami, A. Iijima and J. W. Ward, pages 103–112 (1986). Intermediate pore crystalline molecular sieves have pores which exist between 0.4 nm and 0.8 nm, especially about 0.6 nm. Such includes for the purposes of this invention crystalline molecular sieves have pores between about 0.5 to about 0.7 nm.

Lok et al. Journal of the American Chemical Society, 1984, pp.6092–6093, describe the intermediate pore SAPOs thusly:

SAPO-11, -31, -40, and -4I are intermediate to large in pore size. Both SAPO-11 and SAPO-4I, more readily admit cyclohexane (kinetic diameter, 6.0 Å) than 2,2-dimethylpropane (kinetic diameter, 6.2 Å). SAPO-31 and SAPO-40 adsorb 2,2-dimethylpropane, but exclude the larger triethylamine (kinetic diameter, 7.8 The pore sizes of these structures are defined by either open 10-rings as in silicalite (6 Å) or puckered 12-rings, with 12-rings most probably for SAPO-31 and -40.

The new families of crystalline microporous molecular sieve oxides referred to, and which are the objects for further improvements in the aforementioned co-pending applications, have been recently patented or filed on (by the filing of patent applications), see Table A of those applications. They are based on the presence of aluminum and phosphorus in the framework of the crystal structures. These molecular sieves are actually not zeolites[1] because they are not aluminosilicates and many possess novel crystal structures relative to the known zeolites while others possess framework structures comparable in topology to certain zeolites. For convenience, they are herein characterized as members of the family of "non-zeolitic molecular sieves" which family is generically referred to by the acronym "NZMS". A list of the patents and patent applications covering certain of the NZMSs, and a description of their subject matter, is set out in Table A of those applications. The manufacturing procedures of these new families are employed in the practice of this invention.

[1] According to J. V. Smith, Amer. Mineral Soc. Spec. Paper (1963) 1, 281: "a zeolite is an aluminoslicate with a framework structure enclosing cavities occupied by large ions and water molecules, both of which have considerable freedom of movement, permitting ion-exchange and reversible dehydration." See J. Rabo, Zeolite Chemistry and Catalysis, published by the American Chemical Society, Washington, D.C., ASC Monograph 171, 1979, Chapt. 1, p. 3 (J. V. Smith) Because of the importance of this new family of NZMSs to this invention, it is appropriate to quote from Flanigen et al, supra. in respect to the nomenclature of those materials:

"The materials are classified into binary (2), ternary (3), quaternary (4), quinary (5), and senary (6) compositions based on the number of elements contained in the catonic framework sites of any given structure. A normalized $TO_2$ formula represents the relative concentration of framework elements in the composition, $(El_x Al_y P_z)O_2$, where El is the incorporated element and x, y and z are the mole fractions of the respective elements in the composition. Acronyms describing the framework composition are shown in Table I, e.g., SAPO=(Si, Al; P)$O_2$ composition. The structure type is indicated by an integer following the compositional acronym, e.g., SAPO-5 is a (Si, Al, P)$O2$ composition with the type 5 structure. The numbering of the structure type is arbitrary and bears no relationship to structural numbers used previously in the literature, e.g. ZSM-5, and only identifies structures found in the aluminophosphate-based molecular sieves. The same structure number is used for a common structure type with varying framework composition."

TABLE 1

| Acronyms for Framework Compositions | | | | | |
|---|---|---|---|---|---|
| $TO_2$, T = | Acronym | $TO_2$, T = | Acronym | $TO_2$, T = | Acronym |
| Si,Al,P | SAPO | Me,Al,P,Si | MeAPSO | Other Elements: | |
| | | Fe,Al,P,Si | FAPSO | El,Al,P | ElAPO |
| Me,Al,P | MeAPO | Mg,Al,P,Si | MAPSO | El,Al,P,Si | ElAPSO |
| Fe,Al,P | FAPO | Mn,Al,P,Si | MnAPSO | | |
| Mg,Al,P | MAPO | Co,Al,P,Si | CoAPSO | | |
| Mn,Al,P | MnAPO | Zn,Al,P,Si | ZAPSO | | |
| Co,Al,P | CoAPO | | | | |
| Zn,Al,P | ZAPO | | | | |

That nomenclature will be followed in characterizing how a particular phase of the composites of this invention are made. For example, if a phase is made by the procedure for making SAPO-11, then the phase will be characterized as a SAPO-11; if a phase is made by the procedure for making AlPO$_4$-11, then the phase will be characterized as an AlPO$_4$-11; and so forth.

The molecular sieves described in Table A of the copending applications and in the Flanigen et al. article, supra, provide unique catalytic and adsorbent capabilities not as such found in other molecular sieves, particularly the zeolitic molecular sieves. They have a broad range of activity. In most instances, they possess very desirable and superior stability in respect to thermal and hydrothermal properties.

It is recognized in the art that the relative acidity of zeolitic molecular sieves can be characterized by their performance in dilute (2 mole %) n-butane cracking, see Rastelli et al., The Canadian Journal of Chemical Engineering, 60. pages 44–49, February 1982. This is true for the NZMS class of molecular sieves. Lok et al., Journal of the American Chemical Society, 1984, 106, 6092–6093. Where reference is made herein and in the claims to the acidity of a molecular sieve, that acidity characterization is in reference to the material's $k_A$ as determined by its dilute n-butane cracking performance as described by Rastelli et al., supra. In broader terms, acidity means activity in acid catalyzed catalytic reactions generally.

U.S. Pat. No. 4,440,81, one of the patents referred to in Table A of the copending applications, at col. 8, lines 10-16 states the following:

"While not essential to the synthesis of SAPO compositions, it has been found that in general stirring or other moderate agitation of the reaction mixture and/or seeding the reaction mixture with seed crystals of either the SAPO species to be produced or a topologically similar aluminophosphate or aluminosilicate composition, facilitates the crystallization procedure."

Comparable language may be found in many of the other patents and patent applications cited in Table A of the copending applications, see the notations in this regard in such Table A. Specific references are made to examples in the patents and patent applications cited in such Table A where seeding was specifically employed. Many of the patents and patent applications of such Table A discuss and disclose the use of aluminum and phosphorus containing molecular sieves as a source of aluminum and/or phosphorus in the manufacture of the molecular sieves. None of the patents and patent applications of such Table A mention the formation of composites or the formation of multiphase compositions where the phases are distinct and heterogeneous as to each other. None mention octane boosting catalysts using intermediate pore structure NZMSs.

Copending application Ser. No. 07/058,259 (attorney's docket no. 15,444), the disclosure of which is incorporated herein by reference, describes a composite made from NZMSs as a multiphase composite comprising different inorganic crystalline compositions, preferably molecular sieve compositions, as phases thereof wherein at least one phase is grown by crystal growth in the presence of another phase, in which:

(a) the different phases are contiguous and have a common crystal framework structure;

(b) at least one phase contains phosphorus and aluminum atoms as part of the crystal's framework structure, and (c) the composite exhibits a distinct heterogeneity in composition of one phase to another therein. In a preferred embodiment, the multiphase composite is a particulate composition which contains at least 50 weight percent of a multiphase composite comprising different inorganic crystalline compositions, preferably molecular sieve compositions, as phases thereof wherein at least one phase is grown by crystal growth in the presence of another phase, in which:

(a) the different phases are contiguous and have a common crystal framework structure;

(b) at least one phase contains phosphorus and aluminum atoms as part of the crystal's framework structure, and (c) the composite exhibits a distinct heterogeneity in composition of one phase to another therein;

and the remainder of the composition comprises independent particles which are wholly made of a molecular sieve which is of the composition and framework structure of a phase of the composite. The invention in the multiphase composite is capable of being defined in a plurality of ways. For example, the multiphase composite may comprise different inorganic crystalline compositions, preferably molecular sieve compositions, as phases thereof wherein at least one phase comprises a deposition substrate upon which another phase is deposited as an outer layer or there are multiple phases jointly formed, in which:

(a) the different phases are contiguous and have a common crystal framework structure;

(b) at least one phase contains phosphorus and aluminum atoms as part of the crystal's framework structure, and (c) the phase comprising the deposition substrate or one of the phases jointly formed constituting the deposition substrate contains at least about 20 weight percent of the total weight of the phases making up the composite.

Fluid catalytic cracking is a primary source for the production of gasoline in the United States. It is generally practiced by circulating a catalyst in contact with the feedstock, typically vacuum gas oil, in the riser reactor portion of the cracker. The temperature of the riser reactor is about 500° C. (932° F.). The reaction is achieved within seconds. The reaction is completed by the time the feed and catalyst reaches the reactor temperature. The catalyst is separated from the product stream in a stripper and then fed to a regenerator where the catalyst is heated with air and steam at a temperature of about 760° C. (1400° F.). The regenerated catalyst is reintroduced to the reaction feed stream. The cracking reaction generates the following products: gasoline, light cycle oil, heavy cycle oil, coke and gas. Approximately 60 volume % of the product is gasoline, about 20 volume % is light cycle oil, about 10 volume % is heavy cycle oil, about 4–6 weight % is coke and the remainder is gas. The selectivity of the process is measured by the gasoline or gasoline and light cycle oil produced from the feed (vacuum gas oil) introduced as a reactant.

Essentially all of the FCC catalysts employed today contain a zeolite as the cracking catalyst. Approximately 98% of these zeolites are zeolite-Y types. Zeolite-Y has a faujasite crystallographic framework. It is aluminosilicate produced by the hydrocrystallization of aluminate and silicate raw materials. A specific illustration for their manufacture and their performance can be found at Chapter 11, Pages 615–664 of Rabo, supra.

Some of the commercial FCC Y-type zeolites contain significant amounts, as much as 18-weight percent or more, of calcined rare earth oxides. They are known by the acronym "CREY". Another particularly desirable cracking catalyst is stabilized Y, known as USY or Y-82.

In the process of using the catalyst, the catalyst is subjected to a significant amount of steam treatment at temperatures up to 760° C. and above in the regenerator typically in the presence of air. The regenerator temperature is much higher than the temperature in the reactor. The purpose of the steam and air treatment is to aid in the regeneration of the catalyst by the combustion of coke which is deposited in the cracking reaction step.

The necessity of removing coke efficiently from the catalyst requires the catalyst to have outstanding thermal and hydrothermal stability. The severe conditions of the process requires an extremely sturdy composition. These catalysts typically have a life span of about three to six months.

Extremely important to the FCC process are the issues of residence time in the reactor and tortuous diffusion existing within the zeolite crystallites of 1–5 micron size with about 8 Å pores. The cracking process is carried out at high temperatures in the presence of acidic crystallites of the catalyst (zeolite Y). If the reactant spends too much time with and within the catalyst, there occur the undesirable secondary reactions discussed above, generating such unwanted by-products as coke and gas. In addition, the octane value of the gasoline suffers. Tortuous diffusion of the feed and reaction product in the catalyst crystals increases the contact time for a large fraction of the molecules present, and such reduces the ability to rely upon space velocity, an engineer's tool to establish residence time, as a clearly defined process parameter. The sensitive nature of the activity of the catalyst to the overall ability of the catalyst to selectively produce the gasoline product can only in part be determined by correlating the acidity of the catalyst with the process conditions, including the residence time, catalyst/oil ratio, and the like. Some catalyst, by their nature, will generate more coke while others will generate more gas. The role of tortuous diffusion to the results obtained requires consideration in correlating process conditions.

Octane ratings have emerged in recent years to be important technical issues in the manufacture of gasoline. With the evolution of unleaded gas as a national criteria in the United States, it has become desirable to achieve gasoline in the FCC process with the highest possible octane rating.

Much FCC produced gasoline is employed in the United States for blending to enhance octane. Recent studies indicate that FCC accounts for nearly 35% of the gasoline produced in the United States. FCC gasoline has an octane rating of about 86.5–87.5 whereas the United States gasoline octane pool has an octane rating of about 85.9. This difference in octane is viewed as significant. It follows that the FCC gasoline is very useful in enhancing the octane rating of other lower octane gasoline sources. To achieve the lead phase out mandated by the EPA, and increase the United States gasoline octane pool rating to greater than 88 to meet the automotive requirements, it will be necessary to rely extensively on components which would enhance a gasoline's octane rating that are produced by such refinery processes as reforming, isomerization, alkylation and FCC.

Current octane enhancing FCC catalysts typically rely on steam stabilized Y zeolite (frequently called "USY") containing catalysts. USY or US-Y are acronyms for ultra stable Y. Their properties and manufacture are described at pages 102, 164, 249 and 318–329 of Rabo, supra. When USY is compared in performance to calcined rare earth Y (CREY) zeolites, the more extensively used gasoline catalyst, USY provides an improvement in octane plus a reduction in coke make. It appears that USY is not as effective as CREY in providing gasoline selectivity. A loss in gasoline selectivity (yield) is typically accompanied by increased gas (as contrasted to liquid) make. In addition, USY based catalysts rapidly deactivate in steam, an unavoidable enviromental condition that a FCC catalyst is subjected to in gasoline manufacture. Consequently, USY becomes less active than CREY catalysts in a short time. Activity of USY can be improved by using higher USY concentration in the catalyst, but this is costly and results in catalysts with reduced attrition resistance. The alternative is to apply small amounts of rare earth by cation exchange; however, such catalysts produce lower octane gasoline.

USY catalysts are superior to CREY catalysts because they generate gasoline which is significantly richer in olefins and somewhat lower in aromatics. The higher olefins content causes higher octane ratings. Improved olefinicity is associated with reduced acid site concentration and lower polarity for USY zeolites in FFC use resulting in lower hydrogen transfer activity relative to CREY based catalysts. Hydrogen transfer consumes olefins and produces paraffins and aromatics according to the following equation 3 olefins+1 naphthenes→3 paraffins+1 aromatic Both the olefins and aromatics are high octane gasoline components but since three olefins are destroyed to produce one aromatic molecule, a net octane loss results by this hydrogen transfer reaction. The CREY containing catalysts have the highest acid site concentration in the FCC environment as well as reactant concentration, each of which leads to higher H− shift rates. USY, presteamed to reflect the extended exposure to FCC conditions, transforms to zeolitic molecular sieve products which are extremely "low" in both acid site concentration and in reactant concentration. Thus USY FCC catalysts, by lacking this secondary hydride shift activity, produce a more olefinic and higher octane gasoline than is produced using the CREY containing catalysts. See Rabo, Unifying Principles in Zeolite Chemistry and Catalysis, *Catal. Rev.-Sci. Eng.*, 23 (1 & 2), pp. 293-313 (1981).

USY containing catalysts produce higher octane gasoline in lower yields due to increased secondary cracking activity whereas CREY containing catalysts produce higher gasoline yields but with lower octane due to enhanced hydrogen transfer, another secondary reaction.

There has developed in recent years an additive technology for enhancing the octane rating of gasoline. Illustrations of this technology can be found in U.S. Pat. Nos. 4,309,279, 4,309,280 and U.S. Pat. No. 4,289,606. Those patents describe the addition of an octane enhancing additive such as ZSM-5 into a FCC process in order to boost the resulting gasoline's octane rating. The additive ZSM-5 cracks the low octane gasoline components such as paraffins to gas, thus removing them from the gasoline mixture. This generates a higher octane but at a lower gasoline yield.

U.S. Pat. No. 4,309,279 illustrates how one may employ an octane boosting catalyst in a FCC operation. The description in U.S. Pat. No. 4,309,279 of FCC processing and the application of octane boosting with an octane boosting catalyst is incorporated herein by reference.

U.S. Pat. No. 4,512,875, patented Apr. 23, 1985, describes the use of physical mixtures of non-zeolites $AlPO_4$, silicalite and SAPO in Combination with conventional zeolite catalysts for hydrocarbon cracking processes for converting a crude oil feed which contains certain carbon hydrogen fragmentation compounds. Copending U.S. application, Ser. No. 675,283, filed Nov. 27, 1984, commonly assigned, is concerned with the use of SAPO molecular sieves as catalysts for cracking crude oil feedstocks. Copending U.S. application, Ser. No. 675,279, filed Nov. 27, 1984, commonly assigned, is concerned with the use of mixtures of SAPO molecular sieves in combination with zeolitic aluminosilicate molecular sieves as catalysts for enhancing gasoline octane by increasing the ratio of branched to linear olefins and iso to normal paraffins. Copending U.S. application, Ser. No. 682,946, filed Dec. 18, 1984, commonly assigned, describes the use of mixtures of a SAPO molecular sieve with a hydrogenation catalyst and, optionally, one or more traditional hydrocracking catalysts. Included in such traditional hydrocracking catalyst are conventional zeolitic aluminosilicates. Copending U.S. patent application, Ser. No. 683,246, filed Dec. 18, 1984, commonly assigned, is directed to catalytic dewaxing and hydrodewaxing processes and employs traditional dewaxing catalysts containing zeolitic aluminosilicate mixed with SAPO molecular sieve catalyst The mixed catalyst of these copending applications provide advantages over the traditional zeolite catalysts "Octane boosting," according to the invention of this application, is effected by providing a small amount of a special additive catalyst (hereinafter called an "octane booster" or "octane boosting catalyst") in combination with a standard FCC catalyst or a novel FCC catalyst comprising a composite of the invention of copending U.S. patent application Ser. No. 07/058,259 (attorney's docket no. 15,444). In other words, another catalyst (the "octane booster" or "octane boosting catalyst") is provided to the gasoline formation of an FCC process to generate greater yields of gasoline components that provide better octane ratings for the gasoline produced It has been determined that certain of the composites of copending U.S. patent application Ser. No. 07/058,259 (attorney's docket no 15,444) lend themselves to octane boosting, without the level of gasoline yield loss of the prior art technology, by acting as the active component of an octane boosting catalyst. In particular, it has been found that an intermediate pore NZMS deposited on another comparable NZMS are such active components for an octane boosting catalyst

SUMMARY OF THE INVENTION

The invention relates to a petroleum catalytic cracking process in the presence of a petroleum cracking catalyst and an octane boosting catalyst where the improvement comprises employing as the octane boosting catalyst a composite of an intermediate pore NZMS in combination with another non-zeolitic molecular sieve having the same framework structure.

The invention relates to the cracking of a petroleum fraction to a lower boiling material by subjecting the petroleum fraction to catalytic cracking conditions in the presence of a petroleum cracking catalyst and an octane boosting catalyst comprising a composite of an intermediate pore NZMS in combination with another non-zeolitic molecular sieve having the same framework structure. In a very desirable embodiment of this invention, there is employed as an octane boosting catalyst a composite of an intermediate pore SAPO in combination with another intermediate pore NZMS having the same framework structure.

In a preferred embodiment, the composite octane boosting catalyst is present in an amount which is not greater than about 50 weight percent of the combined weight of the petroleum cracking catalyst and the octane boosting catalyst. In the most desirable embodiment of the invention, the cracking is effected by fluid catalytic cracking (FCC) using a FCC catalyst such as an ultrastable Y or a LZ-210 containing catalyst and a relatively smaller amount of the octane boosting catalyst comprising a composite of an intermediate pore structure NZMS in combination with another NZMS having the same framework intermediate pore structure.

The invention relates also to the novel octane boosting catalysts and to blends of these novel octane boosting catalysts and FCC cracking catalysts.

DETAILS OF THE INVENTION

This invention is directed to octane boosting catalysis in which the octane boosting catalyst exhibits uniquely superior performance in terms of the comtination of activity, selectivity and Stability to prior art octane boosting catalysts.

The purpose of catalytic cracking of petroleum is to create a more useful product having greater value. As pointed out previously, FCC is an effective process for making gasoline. However, while there is a strong commercial need to effect cracking so that the maximum octane ratings are attained, there is little advantage to effecting octane boosting if the economic gain is lost or compromised by loss in gasoline yield. This disadvantage is spelled out in U.S. Pat. No. 4,309,279 (see col. 2, lines 12-18). That patent uses ZSM-5 zeolitic molecular sieve as a shape selective octane boosting catalyst. The patent show in the examples that that octane boosting catalyst caused a loss in $C_5+$ gasoline yield. Such loss was compensated for by an increase in "potential alkylate yield" suggesting that through downstream processing one may fabricate an economic advantage from the use of ZSM-5 as an octane boosting catalyst.

This invention is directed to a cracking process whereby a petroleum fraction may be cracked to a lower boiling fraction(s) without loss or minimal loss in yield of the lower boiling fraction(s). In particular, this invention is directed to a cracking process to produce gasoline with an enhanced octane rating using the aforementioned petroleum cracking catalysts in combination with the select class of composite catalysts of this invention in a manner that minimizes loss in gasoline yield. Thus, octane boost can be achieved without the level of gasoline loss cited in U.S. Pat. No. 4,309,279.

In its broadest aspect, this invention is directed to a petroleum cracking process where petroleum fractions are cracked to lower boiling fractions in which the petroleum fraction is subjected to catalytic cracking conditions in the presence of a catalytic cracking catalyst and the octane boosting catalyst of this invention. The catalytic cracking catalyst may be any of those known in the art as well as those disclosed in copending U.S. patent application Ser. No. 07/058,275, (attorneys docket 15444-1) filed on even date herewith. Illustrative of suitable cracking catalysts are the following acidic zeolites: AgX, AgY, AlHY, BaX, BaY, Be-Y, Ca-germanic near-faujasite, Ca-HX, Ca-X, Ca-Y, CdX, CdY, CeY, CoX, CoY, CrY, CsX, CsY, Cu-X, Cu-Y, diethylammonium Y, ethylammonium Y, Fe-X, Fe-Y, group IAX, group IAY, group IIAY, HY, KX, KY, La-X, La-Y, LiX, LiY, LZ-10, LZ-210, MgHY, MgNaX and Y, MgNH4Y, MgX, MgY, MnX, MnY, Na-germanic near faujasite, Na-X, Na-Y, NH4-germanic near faujasite, NH4X, NH4Y, Ni-X, Ni-Y, rare earth X, rare earth Y, RbX, RhY, SrX, SrY, steam stabilized or ultra-stable Y, tetramethylammonium Y, triethylammonium Y, X, Y, Y-62, Y-82, Zn-X, and Zn-Y.

Particular preferred cracking catalysts are LZ-10, LZ-210, Na-Y, NH4X, NH4Y, rare earth X, rare earth Y, CREY steam stabilized or ultra-stable Y, X, Y, Y-62, and Y-82.

The active component of the octane boosting catalyst of the invention comprises a composite of intermediate pore structure NZMS deposited as an outer layer upon a microporous, crystalline molecular sieve that has the same framework structure. In a most preferred embodiment, the invention comprises a composite of intermediate pore structure SAPO deposited as an outer layer upon a microporous, crystalline molecular sieve that has the same framework structure.

This invention is directed to octane boosting catalysts that utilize composites in which intermediate pore structure NZMS, especially a SAPO molecular sieve, is in integral lattice association2 with another structurally compatible microporous inorganic material, inclusive of the NZMSs of Table A of the copending applications filed on even date herewith. In present day terms, the other structurally compatible microporous inorganic materials are fairly well limited to the "-11, -31, -40 and -41" class of NZMSs, such as AlPO4-11, SAPO-11, MeAPO-11 (Me=Co,Fe,Mg,Mn,Zn), MeAPSO-11 (Me=Co,Fe,Mg,Mn,Zn), ELAPO-11 (EL=As,Be,B,Cr,Ga,Li,V,Ti), ELAPO-11 (EL=As,Be,B,Cr,Ga,Li,V,Ti), AlPO4-40, SAPO-40, ELAPO-40 (EL=As,Be,B,Cr,Ga,Li,V), ELAPSO-40 (EL=As,Be,B,Cr,Ga,Li,V), AlPO4-31, SAPO-31, MeAPSO-31 (Me=Co,Fe,Mg,Mn,Zn), and ELAPO-31 (EL=As,Be,B,Cr,Ga,Li,V,Ti), ELAPSO-31 (EL=As,Be,B,Cr,Ga,Li,V,Ti), AlPO4-41, SAPO-41, MeAPO-41 (Me=Co,Fe,Mg,Mn,Zn), MeAPSO-41 (Me=Co,Fe,Mg,Mn,Zn), ELAPO-41 (EL=As,Be,B,Cr,Ga,Li,V), and ELAPSO-41 (EL=As,Be,B,Cr,Ga,Li,V). That class and the members thereof are hereinafter called "intermediate pore structure NZMS(s)".

[2] It is believed that the integral lattice association (viz. an epitaxial alignment) of the composites of this invention involves a direct chemical linkage between the phases constituting the composite.

The active component of the octane boosting catalysts of this invention is directed to an essentially crystalline composite structure. Though the composite may be further composited with amorphous or different kinds of crystalline materials, and such is also part of this invention in generating the cracking process of this invention, the crystalline composite is "crystalline" as that term is understood in this art and as further discussed below. The crystalline composite of this invention comprises multiple phases, at least one of which contains an aluminum and phosphorus containing crystal framework structure in an intermediate pore structure NZMS.

The various phases of the composite are integrally bonded to each other by growth of a crystal surface from another such that the crystal structures of the phases yield a composite having a heterogeneous chemical composition. In that sense, the framework structure of the phases are essentially crystallographically common to each another. As pointed out above, the phases of the composites are in integral lattice association with each other. It is believed that the phases are joined together by direct chemical linkages. The phases of the composites of this invention are not simple blends or physical mixtures that are bonded together by an adhesive generated by a third component which fails to satisfy the crystallographic characterization of the phases and their epitaxial relationships in the composites of this invention. In a most preferred embodiment, the composite comprises a core particle enveloped by a shell or mantle in which the core and shell constitute different phases contiguously aligned with each other and their crystal framework structures are, in material crystallographic terms, the same. In the preferred embodiment, the shell or mantle is composed of intermediate pore structure SAPO and the core is made of a molecular sieve of a different chemical composition which does not materially interfere with the octane boosting capabilities of intermediate pore structure SAPO (in those terms, a material which is inert from the standpoint of this invention).

It has been determined that much of the benefits of NZMSs as catalysts are achieved in the outer surface portion (mantle) of the sieve particle. Where a NZMS is employed as a catalyst in a chemical reaction in which irreversible secondary reactions occur that generate by-products, much of the primary reaction occurs in the outer mantle and much of the secondary reaction(s) occurs in the core area of the molecular sieve particle. This phenomena is believed to be, to a large extent, the product of the tortuous diffusion of the adsorbate(s) through the core of the molecular sieve particle This extra contact with an active catalyst phase results in undesired secondary reaction(s) being promoted.

The efficiency or selectivity of a chemical reaction is measured by the ability of the catalyst to generate the primary reaction product(s) while avoiding or minimizing the formation of the irreversible (in the context of the reactions) secondary reaction product(s). In this context, it should be appreciated that a secondary reaction product is considered an undesired by-product of the reaction. This invention is directed to providing NZMS catalysts that achieve enhanced efficiencies or selectivities to the primary reaction product(s), the higher octane gasoline, while minimizing the adverse secondary reactions.

This invention provides for a particulate composite composition that possesses a differentiation in catalytic activity and/or selectivity within the particle at different parts thereof. This is accomplished through selection of the composition of the phases of the composite and the nature of their placement in the composite's structure. If the core of the composite is made of a phase that is inactive or less active than the layer or phase of the composite surrounding it, then the reaction product of a tortuous diffusion of reactant to the core will result is less secondary reaction products being formed than if the whole particle were made of the composition of the surrounding active layer. Higher selectivities are the result.

This invention is directed to the use of a sufficient amount of a phase within a multiphase composite that the heterogeneity of the various phases are maintained. Thus, when utilizing one phase as a deposition substrate for another phase, the deposition substrate must be present in the ultimate composite in such an amount that it retains its identity as a distinct phase within the composite, that is, the composite is clearly composed of phases which are compositionally heterogeneous with each other but are topologically compatible with each other. This is regarded, in characterizing this invention, as providing that a deposition substrate constitute at least about 20 wt. % of the total weight of the phases making up the composite. In other words, the language "of at least about 20 wt. %" is intended to mean that the amount of such a phase present in the composite is sufficient for it to have a separate and distinct heterogeneous compositional identity vis-a-vis the other phases of the composite.

In the context of this invention, the primary reaction is the incremental change in the composition of the gasoline fraction giving a boost in octane as a result of using the octane boosting catalyst of the invention. With that in mind, the efficiency or selectivity of the chemical reaction(s) resulting in the octane boost or enhancement is measured by the ability of the catalyst to generate the primary reaction product(s) while avoiding or minimizing the formation of the secondary reactions which tend to counteract the economic benefits of octane boosting. In this context, it should be appreciated that a secondary reaction product (such as coke and gas) is considered an undesired by-product of the reaction. This invention is directed to providing octane boosting catalysts and processes that achieve enhanced efficiencies or selectivities to the primary reaction product(s) which reflect an enhancement in octane rating of the gasoline product while minimizing the secondary reaction product(s) which would impair such octane enhancement as by, e.g., lowering gasoline yield Crystalline molecular sieves, whether zeolites or of the NZMS variety, are formed as small crystals ranging in size from about 0.1 microns ($0.4 \times 10^{-5}$ inch) to about 75 microns (0.003 inch) in diameter, usually between 0.1-10 microns. The spread in particle size for any particular molecular sieve is about 10 microns in diameter. Crystalline molecular sieves are not spheres, they can range from regularly to irregularly shaped structures in the fashion of most crystals Many are formed as part of agglomerations of crystals. In this specification, the characterization of the cross-section of a molecular sieve is viewed as the diameter of a sphere, the diameter being the nominal basis for determining the difference between the sizes of individual crystals and not of agglomerates of the crystals This is not to imply that such crystals are spherical.

The invention also encompasses an octane boosting catalyst which involves a heterogeneous mixture comprising:

(A) a multi-compositional, multiphase composite comprising different inorganic crystalline molecular sieve compositions as phases thereof wherein at least one phase is grown by crystal growth in the presence of another phase, in which:

(a) the different phases are contiguously aligned to each other and possess a common crystal framework structure;

(b) at least one phase contains phosphorus and aluminum atoms as part of the crystal's framework structure;

(c) the composite exhibits a distinct compositional heterogeneity of one phase to another therein;

(d) one of the phases, preferably the outer layer or the mantle phase, comprises intermediate pore structure NZMS, preferably a SAPO, and (B) an inorganic crystalline composition which is not so contiguously aligned and not sharing a common crystal framework structure with the multi-compositional, multiphase composite of (A), but is bonded to the multi-compositional, multiphase composite of (A) or (C) an amorphous composition composition which is bonded to the multi-compositional, multiphase composite of (A).

The aforementioned heterogeneous mixture may contain amorphous catalyst matrix material which allows the configuration of the mixture to a shape and size for effective catalytic cracking processing As pointed out above, it is desired that the intermediate pore structure NZMS phase comprise the outer layer or mantle of the composite. The core of the composite may be any of another of the intermediate pore structure NZMSs provided it has a common crystallographic intermediate pore structure to the intermediate pore structure NZMS phase being employed Since, at this time, there are no presently known synthetic zeolitic molecular sieves which possess a microporous crystal structure that is framework compatible (or its equivalent) with intermediate pore structure NZMSs, the other phase of the composite is of necessity derived from the intermediate pore structure NZMSs. The core of the composite is desirably made of the less catalytically active of the NZMSs (especially of a framework compatible molecular sieve that is inert to the octane boosting reaction) such as the $AlPO_4$s. Particularly desirable phase composition are $AlPO_4$-11, -31, -41, and -40. Their manufacture can be found in U.S. Pat. No. 4,310,440, patented Jan. 12, 1982 and U.S. patent application Ser. No. 880,059, filed June 30, 1986. For example, Examples 32-36 of the patent shows the characteristic X-ray powder diffraction pattern for $AlPO_4$-11 which contains at least the d-spacings set forth in the following Table F:

TABLE F

| 2-Theta | d | 100 × I/Io |
|---|---|---|
| 9.4–9.5 | 9.41–9.31 | 31–49 |
| 20.5–20.6 | 4.33–4.31 | 34–53 |
| 21.0–21.25 | 4.23–4.19 | 100 |
| 22.15–22.25 | 4.01–4.00 | 12–58 |
| 22.5–22.7 | 3.95–3.92 | 47–75 |
| 23.15–23.5 | 3.84–3.79 | 10–68 |

Other useful AlPO$_4$s and other intermediate pore NZMSs are characterized above. AlPO$_4$-31 is taught in Example 54 of U.S. Pat. No. 4,310,440 and AlPO$_4$-41 is taught in U.S. patent application Ser. No. 880,059, filed June 30, 1986, commonly assigned.

In characterizing the various phases of the composites of this invention, reference is being made to specific chemical compositions which are already known in the art because the phases (viz. SAPO-11) that are made start with either such a chemical composition already made or utilize a method of manufacture which according to the art would generate such a known chemical composition. This does not mean that the chemical composition of the phases is the full equivalent to such characterization. It is believed that whether one starts with an already formed known composition or produces a phase by a procedure which is intended to generate a known composition, that in significant ways the resulting phases in the composite of this invention are different in chemical composition from either the composition initially started with or the intended composition that the procedure was designed to generate. This difference in chemical composition is not reflected in a change in the crystal structure. The significant difference resides in the chemical composition of the interface(s) of the phases. The capacity exists for significant ionic mobility of extra framework cations during the manufacture of molecular sieves. This generates a significant amount of ion transfer by ion exchange to occur. Where one composition is deposited upon another of a different chemical composition, as occurs with this invention, there is this propensity for ion transfer to occur. During deposition of one phase's composition onto another, a part of the other phase redissolves causing a chemical blending of the compositions of the phases at that portion of the interface which nominally belonged to the phase onto which deposition occurs. Because one is dealing in atomic layers, the degree of compositional alteration is thought to be quite small and does not constitute a gross alteration of the composition of any particular phase because the deposition substrate constitutes, in the typical case, a significant proportion of the composite entity. Consequently, there is not seen in the composite enough changes in the chemical composition of a phase such that by nuclear magnetic resonance ("NMR") one can detect a dramatic compositional change in the framework sites of any of the phases. Even though this change occurs, the crystal structure is predictable and accords with the crystal structure expected of the phase. Unresolved is the degree of compositional change and the manner by which the compositional change takes place.

For example, a SAPO-31 or a SAPO-11 phase in composites of this invention are not believed to be completely identical to the SAPO-31 made in accordance with examples 51-53 of U.S. Pat. No. 4,440,,871 or the SAPO-11 made in accordance with Examples 16-22 of U.S. Pat. No. 4,440,871 where those compositions meet at an interface with another molecular sieve composition, in a composite embodied by this invention.

The nature of the deposition of one phase upon the other in the composite is believed to be that of a layer of a phase directly upon the surface of another phase. In such a representation, the deposited layer is termed herein the "outer layer" and the substrate phase providing the deposition surface is termed the "deposition substrate." This terminology holds even though more than two phases exist in the composite. The bonding relationship of the outer layer to the deposition substrate is as characterized above.

The crystal structure of the composites of this invention, or any phase thereof, is determined in accordance with standard analytical procedures of the art. Though the art frequently relies upon X-ray powder diffraction analysis to define or differentiate a new molecular sieve from the prior art, it should be appreciated that the characterization of the crystal structure is not solely dependent upon that type of analysis. There are instances where X-ray powder diffraction analysis will not generate a suitable pattern in order to properly characterize the presence of a crystal structure. Such does not mean that the structure is not crystalline. Other procedures can be employed to demonstrate the existence of a crystal structure. The characterization of a crystal structure is typically determined according to a number of analytical techniques, one of which is X-ray powder diffraction analysis. Such techniques include, by way of example, electron diffraction analysis, molecular adsorption data, and adsorption isotherm characterizations Some phases used in the composites of this invention may not show a distinctive X-ray powder diffraction pattern adequate for crystal structure characterization The other techniques in combination allow one to determine the nature of the crystal lattice in which the phase exists There are cases where the crystal structure is even ill-defined by a combination of techniques, but according to the evidence arrayed, such is characterizable as crystalline by comparison with a particular structure. Such a pseudo-crystalline structure is deemed a crystal for the purpose and understanding of this invention.

The phases of the composites used in the invention relate to each other because they each possess essentially the same crystalline framework structure. In practical terms, this means that the X-ray powder diffraction patterns for the composite (or other evidence of crystallinity) of the multiple phases is the same in essential details other than those affected by changes in the size of different framework cations Though it is possible for each of the phases to have different X-ray diffraction patterns, the differences should be slight enough that in essential crystallographic terms one would regard the different structures to be framework compatible. This is intended to mean that the various phases have crystalline structures which mimic each other in terms of framework topology.

It is important to recognize that the significant advantage of the composites used in this invention over the single compositions which correspond to the proposed composition of a phase of a composite or blends of such single compositions corresponding to the phases of the composite, resides in the superior performance one may achieve from the use of the composite as an octane boosting catalyst.

The benefits of this invention are achieved when the outer layer constitutes less than 80 weight percent of the composite. In most instances, it will be desirable to have the outer layer constitute less than about 60 weight percent, more preferably less than about 50 weight percent, of the weight of the composite. It has been found in most, if not essentially all cases, less secondary reactions occur when the outer layer constitutes a smaller weight or volume of the composite molecular sieve When the outer layer constitutes more than 80 weight percent of the composite, the composite tends to behave as if it were 100 weight percent the composition and structure of the outer layer, and secondary reaction generation is more pronounced when such are used as catalysts as herein characterized. This trend in secondary reactions tends to drop as the weight fraction of the outer layer diminishes.

In the another aspect of this invention, one may make composites in which the amount of the deposition substrate therein range from at least about 20 weight percent of the total weight of the composite up to about 99 weight percent of the total weight of the composite and the amount of the outer layer phase or phases ranges from about weight percent of the total weight of the composite down to about 1 weight percent of the total weight of the composite. In a preferred aspect of this invention, one may make composites in which the amount of the deposition substrate therein range from at least about 40 weight percent of the total weight of the composite up to about 99 weight percent of the total weight of the composite and the amount of the outer layer phase or phases ranges from about 60 weight percent of the total weight of the composite down to about 1 weight percent of the total weight of the composite. In a more preferred case, the composite will be made of two phases and the amount of the deposition substrate in the composite will range from about 50 to about 98 weight percent of the total weight of the composite and the outer layer will constitute from about 2 to 50 weight of the composite.

In the typical case, the outer layer (mantle) has a thickness which is less than that of the deposition substrate layer. In the typical case, the outer layer will weigh less than the deposition substrate. It is preferred that the outer layer comprise a more catalytically active NZMS than that employed for the deposition substrate. The reason for this is, in the typical case, the fact that one will generally choose to employ intermediate pore structure SAPO as the outer layer because of its activity and stability. In a practical application of this invention, it will be desirable to combine the relatively inert and unreactive equivalent intermediate pore structure AlPO$_4$ with the catalytically active intermediate pore structure NZMS. In such a case, it will be desirable that the outer intermediate pore structure NZMS layer contain from about 2 to about 50, preferably about 2 to about 40, weight percent of the total weight of the composite, and the remaining weight be that of a less active intermediate pore structure NZMS such as an equivalent intermediate pore structure AlPO$_4$.

In a preferred embodiment of this invention, the composite is a small particle in the range of from about 0.2 to about 10 microns in its average cross-sectional dimension. The preferred embodiment of the particle comprises an internal core area circumscribed by one or more mantles. If there are more than one mantle, one is an outer layer relative to the other and to the core. For the purpose of describing this invention, as set forth in this specification and the claims, an inner mantle which circumscribes a core, and optionally another and more internal mantle, is termed a core relative to a mantle external of it. Each mantle in contact with each other is made of a different chemical composition and each mantle and core in contact are made of different chemical compositions The particle need not be spherical for the purposes of the invention in order to have the aforementioned core/mantle relationship. The core may be an aggregate of particles about which resides a mantle layer. The particles are typically polyhedral in shape They may contain dendrites and/or spherulites. The ultimate particle may be part of an agglomerate of the particles The normal, as-produced shape of the intermediate pore structure composites is particulate When used as an octane boosting catalyst, it may be employed in the as-produced particulate shape or bonded together into another shape. The processing requirements of the particular cracking reaction in which the octane boosting catalyst is being used will dictate the form of the catalyst. In the context of FCC catalysis, the composite may be used as formed or they may be combined either by a binderless process or by use of other ingredients as binder components and formed into a structure more desirable for the use. The particles can be formed into another shape by a variety of techniques well known in the art, such as by spray drying, combining the particles via a matrix binder, and the like. Catalysts will be made to properly configure to the shape of the reactor or the reaction mode. However, certain special effects can be obtained with the composite structures of this invention. For example, rather than deposit the outer layer onto the deposition surface prior to associating the composite with a matrix bonding media, the deposition substrate can first be shaped by spray drying or by combination with a matrix bonding media according to the use (viz., into pellets, extrudates, and the like) and then the shaped body containing the deposition substrate or surface is subjected to the hydrothermal crystallization in a brew of the precursors forming the outer layer. The outer layer is thus deposited on the deposition surface that remains exposed in the shaped body. This procedure minimizes the amount of outer layer required for a composite/matrix shaped product. In the preferred embodiment, the composite is formed prior to the formation of a shaped body containing the composite.

The benefits of the invention can be appreciated by recognizing that microporous molecular sieves have pores which extend throughout the crystal structure. Most of the catalyst's surface area is found in these pores. It is the pore surface area which provides essentially all of the catalyst's active sites. As the feedstock enters the interior of the catalyst, it progresses a labyrinthian or tortuous course, as such or as reaction products generated in the catalyst Tortuous diffusion dictates that given enough contact time, some of the primary reaction products will react with active sites on the catalyst's pore surface and such generally results in the formation of lower molecular weight products By reducing the size of the labyrinthian course provided by the most active catalyst species the problems associated with tortuous diffusion are reduced. As a result, the selectivity to product is enhanced because the level of contact time within the most active portion of the catalyst is controlled sufficiently to minimize the generation of secondary reaction(s).

A special advantage of the composite structures of this invention resides in the fact that the depth of the layer of a given phase of the composite provides a mechanism for controlling the performance characteristics of that phase as a catalyst. If the phase is extremely active owing to a too high level of acidity, one may retain a high level of catalytic activity while minimizing the destructive features (e.g. secondary reactions) of the high acidity. It is known that the destructive aspects of an acidic and hence active catalyst is dependent upon the residence time a reactant spends in the catalyst. By depositing a small layer of the active phase onto a deposition surface which is relatively inert to the reactant (vis-a-vis the outer layer), the contact time of the reactant with the catalyst, in particular the outer layer, is minimized to the extent that the destructive feature of the catalyst is minimized. It is axiomatic that a useful catalyst which has a propensity to destroy primary reaction products and generate unwanted by-products, does so at a rate lower than the desired catalyzed reaction, otherwise the catalyst would yield little in benefits. By reducing the thickness of the active catalyst layer, the tortuous diffusion contact time will also be reduced in the active catalyst. This should improve the selectivity of the catalyst to produce the desired reaction products and minimize secondary reaction products. The layered composite catalysts of this invention provide such a benefit by controlling the depth of the outer layer, and hence the tortuous diffusion, to accomodate the activity of the outer layer to the desired reaction and reaction products.

Another factor in the design of a composite catalyst made according to this invention is the consideration of the various reactions which may be affected by the catalyst. If the reaction simply involves a conversion of

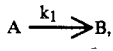

then little criticality with respect to selectivity over the amount and size of the outer layer is seen. However, if the reaction generates irreversible by-products ("C") as in the case of

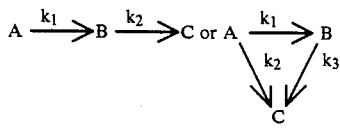

where the secondary reactions $k_2$ and $k_3$ generate undesired by-products C, then it is preferred that the contact within the catalyst be sufficiently limited to the depth of the outer, more active layer such that the predominant reaction is $k_1$ and reactions $k_2$ and/or $k_3$ are minimized, if not avoided. In this way, the catalytic impact is more selective in the case of these layered catalysts than in the full catalyst particle where the outer layer composition is the whole of the particle composition.

One may control the performance of the octane boosting catalysts of the invention in terms of selectivity to gasoline product by adjusting the relationship of the dimensions of the outer layer to the deposition substrate with the aim of minimizing the production of coke and gas.

The composites used in this invention can be made by the hydrothermal crystallization of reactive gel precursors to the crystal structure in the presence of a support surface for crystal growth thereon. The gel precursors depend upon the structure being made. In the case of a silicoaluminum and phosphorus based crystal framework, the precursors are the typical phosphate, aluminate and silicate compositions employed for making them. Indeed, a characteristic of the composites used in this invention is that each phase may be made by conventional procedures in the art for making the composition of the particular phase. It is generally not necessary to employ a new process for generating a phase in the presence of another phase in order to enjoy the fruits of this invention The class of non-zeolitic aluminum and phosphorus based molecular sieves are typically synthesized by hydrothermal crystallization of reactive aluminum and phosphorus containing gels containing optionally the additional framework elements and an organic templating, at temperatures from about 50° C. (122° F.) to about 250° C. (482° F.), preferably from about 100° C. (212° F.) to about 225° C. (437° F.). The optimum crystallization temperature depends on composition and structure The AlPO$_4$ and SAPO materials tend not to crystallize at temperatures below about 125° C. (257° F.), whereas several of the MeAPO species crystallize readily at about 100° C. (212° F.).

The intermediate pore structure NZMS compositions are embraced by the intermediate pore structure "QAPSO" empirical chemical composition on an anhydrous basis expressed by the formula:

$$mR:(Q_wAl_xP_ySi_z)O_2$$

where "Q" represents at least one element present as a framework oxide unit "with charge "n" where "n" may be $-3$, $-2$, $-1$, 0 or $+1$; "R" represents at least one organic templating agent present on the intracrystalline pore system; "m" represents the molar amount of "R" present per mole of $(Q_wAl_xP_ySi_z)O_2$ and has a value from zero to about 0 3; and "w", "x", "y" and "z" represent the mole fractions of $QO_2{}^n$, $AlO_2{}^-$, $PO_2{}^+$, $SiO_2$, respectively, present as framework oxide units. "Q" is characterized as an element having a mean "T-O" distance in tetrahedral oxide structures between about 1.51 Å and about 2.06 Å. "Q" has a cation electronegativity between about 125 kcal/g-atom to about 310 kcal/gm-atom and "Q" is capable of forming stable Q-O-P, Q-O-Al or Q-O-Q bonds in crystalline three dimensional oxide structures having a "Q-O" bond dissociation energy greater than about 59 kcal/-atom at 298 K3; and said mole fractions being within the limiting compositional values or points as follows:

w is equal to 0 to 98 mole percent;
y is equal to 1 to 99 mole percent;
x is equal to 1 to 99 mole percent; and
z is equal to 0 to 98 mole percent.

[3] See the discussion at pages 8a, 8b and 8c of EPC Application 0 159 624, infra, about the characterization of "EL" and "M". Such are equivalent to Q as used herein.

The "Q" of the "QAPSO" molecular sieves of formula (I) may be defined as representing at least one element capable of forming a framework tetrahedral oxide and may be one of the elements arsenic, beryllium, boron, chromium, cobalt, gallium, germanium, iron, lithium, magnesium, manganese, titanium, vanadium and zinc. The invention contemplates combinations of the elements as representing Q, and to the extent such combinations are present in the structure of a QAPSO they may be present in molar fractions of the Q component in the range of 1 to 99 percent thereof. It should be noted that formula (I) contemplates the nonexistance of Q and Si. In such case, the operative structure is that of AlPO₄ as discussed above. Where has a positive value, then the operative structure is that of SAPO, discussed above. Thus, the term QAPSO does not perforce represent that the elements Q and S (actually Si) are present. When Q is a multiplicity of elements, then to the extent the elements present are as herein contemplated, the operative structure is that of the ELAPSO's or ELAPO's or MeAPO's or MeAPSO's, as herein discussed. However, in the contemplation that molecular sieves of the QAPSO variety will be invented in which Q will be another element or elements, then it is the intention to embrace the same as a suitable molecular sieve for the practice of this invention.

Illustrations of QAPSO compositions and structures are the various compositions and structures described in the patents and patent applications set forth in Table A, as afoementioned, and by Flanigen et al., in the paper entitled Aluminophosphate Molecular Sieves and the Periodic Table, supra.

The intermediate pore structure QAPSO compositions are generally synthesized by hydrothermal crystallization from a reaction mixture containing active sources of element(s) "Q" (optional), silicon (optional), aluminum and phosphorus, preferably an organic templating, i.e., structure-directing, agent which is preferably a compound of an element of Group VA of the Periodic Table, and/or optionally an alkali or other metal. The reaction mixture is generally placed in a sealed pressure vessel, preferably lined with an inert plastic material such as polytetrafluoroethylene and heated, preferably under autogenous pressure at an effective temperature which is preferably between about 100° C. (212° F.) and about 225° C. (437° F.), more preferably between 100° C. (212° C.) and 200° C. (424° F., until crystals of the specific variety of QAPSO product are obtained, usually an effective crystallization time of from several hours to several weeks. Generally, effective crystallization times of from about 2 hours to about 30 days are employed with typically from 4 hours to about 20 days being employed to obtain the QAPSO product version. The product is recovered by any convenient method such as centrifugation or filtration.

In synthesizing the QAPSO compositions used in the instant invention, it is preferred to employ a reaction mixture composition expressed in terms of molar ratios as follows:

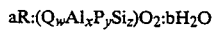

wherein "R" is an organic templating agent having the capacity of generating the -Il framework structure; "a" is the amount of organic templating agent "R" and has a value of from zero to about 6 and is preferably an effective amount within the range of greater than zero (0) to about 6; "b" has a value of from zero (0) to about 500, preferably between about 2 and about 300; "Q" represents at least one element, as hereinbefore described, capable of forming a framework −11 oxide unit, $QO_2^n$, with $SiO_2$, $AlO_2^-$ and $PO_2^+$ tetrahedral oxide units; "n" has a value of −3, −2, −1, 0 or +1; and "w", "x", "y", "z" are as defined above.

In the foregoing expression of the reaction composition, the reactants are normalized with respect to the total of "w", "x", "y", and "z" such that w+x+y+z =1.00 mole, whereas in the examples in the reaction mixtures may be expressed in terms of molar oxide ratios normalized to the moles of $P_2O_5$. This latter form is readily converted to the former form by routine calculations by dividing the number of moles of each component (including the template and water) by the total number of moles of elements "Q", aluminum, phosphorus and silicon which results in normalized mole fractions based on total moles of the aforementioned components.

In forming reaction mixtures from which the intermediate pore structure QAPSO molecular sieves are formed, an organic templating agent is preferably employed and may be any of those heretofore proposed for use in the synthesis of conventional zeolite aluminosilicates but, in any case, the template chosen is that template taught in the art for making the QAPSO being made. In general, these compounds contain elements of Group VA of the Periodic Table of Elements, particularly nitrogen, phosphorus, arsenic and antimony, preferably nitrogen or phosphorous and most preferably nitrogen, which compounds also contain at least one alkyl or aryl group having from 1 to 8 carbon atoms. Particularly preferred compounds for use as templating agents are the amines, quaternary phosphonium and quaternary ammonium compounds, the latter two being represented generally by the formula $R_4X^+$ wherein "X" is nitrogen or phosphorous and each R is an alkyl or aryl group containing from 1 to 8 carbon atoms. Polymeric quaternary ammonium salts such as $[(C_{14}H_{32}N_2)(OH)_2]_x$ wherein "x" has a value of at least 2 are also suitably employed. The mono-, di- and tri-amines are advantageously utilized, either alone or in combination with a quaternary ammonium compound or other templating compound. Mixtures of two or more templating agents may either produce mixtures of the desired QAPSOs or the more strongly directing templating species may control the course of the reaction with the other templating species serving primarily to establish the pH conditions of the reaction gel. The initial gel pH in most cases is weakly acidic facilitating the successful incorporation of the hydrolyzable metal cation form of the elements into the frameworks, and inhibiting their precipitation as spurious hydroxides or oxides. Representative templating agents include: ammonium ions such as tetramethylammonium, tetraethylammonium, tetrapropylammonium, tetrabutylammonium, and tetrapentylammonium and amines such as di-n-propylamine, tripropylamine, triethylamine, triethanolamine, piperidine, cyclohexylamine, 2-methylpyridine, N,N-dimethylbenzylamine, N,N-dimethylethanolamine, choline, N,N'-dimethypiperazine, I,4-diazabicyclo(2,2,2,)octane, N-methyldiethanolamine, N-methylethanolamine, N-methylpiperidine, 3-methylpiperidine, N-methylcyclohexylamine, 3-methylpyridine, 4-methylpyridine, quinuclidine, N,N'-dimethyl-1,4-diazabicyclo(2,2,2)octane, di-n-butylamine, neopentylamine, di-n-pentylamine, isopropylamine, t-butylamine, ethylenediamine, diethylenetriamine, triethylenetetraamine, pyrrolidine, 2-imidazolidone, and the like. Not every templating agent will direct the formation of every species of QAPSO, i.e., a single templating agent may, with proper manipulation of the reaction conditions, direct the formation of several QAPSO compositions, and a given QAPSO composition can be produced using several different templating agents.

As Flanigen et al., in the paper entitled Aluminophosphate Molecular Sieves and the Periodic Table, supra. point out:

"The organic template appears to play a critical structure-directing role. The template is trapped or clathrated in the structural voids as the crystals grow. Over eighty-five amines and quaternary ammonium species have been used successfully as crystallization templates, including primary, secondary, tertiary and cyclic amines, and alkanolamines. The degree of template-structure specificity varies from the crystallization of AlPO₄—5 with twenty-three templates to the formation of AlPO₄—20 with only one template.17) Table 6, a summary of typical templates forming the major structures, amply illustrates one template forming many structures (11, 31, 41 and 46 with di-n-propylamine). Here, structure control is exercised by other synthesis variables such as temperature, template concentration, gel oxide composition, and pH. The influence of the template is both steric and electronic, and typically exhibits the neat stoichiometry and space-filling characteristics illustrated for AlPO₄—5 and 11."

TABLE 6

Structure-Template Relationships

| Structure Type | Typical Template(s) |
|---|---|
| Large Pore | |
| 5 | tetrapropylammonium, tri-n-propylamine |
| 36 | tri-n-propylamine |
| 37 | tetrapropylammonium + tetramethylammonium |
| 46 | di-n-propylamine |
| Intermediate Pore | |
| 11 | di-n-propylamine, di-iso-propylamine |
| 31 | di-n-propylamine |
| 41 | di-n-propylamine |
| Small Pore | |
| 14 | isopropylamine |
| 17 | quinuclidine, piperidine |
| 18 | tetraethylammonium |
| 34 | tetraethylammonium |
| 35 | quinuclidine |
| 44 | cyclohexylamine |
| 47 | diethylethanolamine |
| Very Small Pore | |
| 20 | tetramethylammonium |

The foregoing description of the role of the templating agent is characteristic of the general role of templating agents in respect to the manufacture of others of the QAPSO family.

The source of silicon may be silica, either as a silica sol or as fumed silica, a reactive solid amorphous precipitated silica, silica gel, alkoxides of silicon, silica containing clays, silicic acid or alkali metal silicate and mixtures thereof.

The most suitable phosphorus source yet found for the aluminophosphates is phosphoric acid, but organic phosphates such as triethyl phosphate have been found satisfactory, and so also have crystalline or amorphous aluminophosphates such as the AlPO₄ compositions of U.S.P. 4,310,440. Organo-phosphorus compounds, such as tetrabutylphosphonium bromide do not appear to serve as reactive sources of phosphorus, but these compounds do function as templating agents. Conventional phosphorus salts such as sodium metaphosphate, may be used, at least in part, as the phosphorus source, but are not preferred.

The preferred aluminum is either an aluminum alkoxide, such as aluminum isoproproxide, or pseudoboehmite. The crystalline or amorphous aluminophosphates which are a suitable source of phosphorus are, of course, also suitable sources of aluminum. Other sources of aluminum used in zeolite synthesis, such as gibbsite, aluminum-containing clays, sodium aluminate and aluminum trichloride, can be employed but are not preferred.

The element(s) "Q" can be introduced into the reaction system in any form which permits the formation in situ of a reactive form of the element, i.e., reactive to form a framework oxide unit of element "Q". Compounds of element(s) "Q" which may be employed include (but are not limited to) oxides, hydroxides, alkoxides, nitrates, sulfates, halides, carboxylates and mixtures thereof. Representative compounds which may be employed include inter alia: carboxylates of arsenic and beryllium; cobalt chloride hexahydrate, alpha cobaltous iodide; cobaltous sulfate; cobalt acetate; cobaltous bromide, cobaltous chloride; boron alkoxides; chromium acetate; gallium alkoxides; zinc acetate; zinc bromide; zinc formate; zinc iodide; zinc sulfate heptahydrate; germanium dioxide; iron (II) acetate; lithium acetate; magnesium acetate; magnesium bromide; magnesium chloride; magnesium iodide; magnesium nitrate; magnesium sulfate; manganese acetate; manganese bromide; manganese sulfate; titanium tetrachloride; titanium carboxylates; titanium acetate; Zinc acetate; and the like.

After crystallization, the QAPSO product may be isolated and advantageously washed with water and dried in air. The as-synthesized QAPSO generally contains within its internal pore system at least one form of any templating agent employed in its formation. Most commonly, this organic moiety, derived from any organic template, is at least in part present as a charge-balancing cation, as generally is the case with as-synthesized aluminosilicate zeolites prepared from organic-containing reaction systems. It is possible, however, that some or all of the organic moiety may be an occluded molecular species in a particular QAPSO species. As a general rule the templating agent, and hence the occluded organic species, is too large to move freely through the pore system of the QAPSO product and must be removed by calcining the QAPSO at temperatures of 200° C. to 700° C. to thermally degrade the organic species. In some instances the pores of the QAPSO compositions are sufficiently large to permit transport of the templating agent, particularly if the latter is a small molecule, and accordingly complete or partial removal thereof may be accomplished by conventional desorption procedures such as carried out in the case of zeolites. It will be understood that the term "as-synthesized" as used herein does not include the condition of QAPSO species wherein any organic moiety occupying the intracrystalline pore system as a result of the hydrothermal crystallization process has been reduced by post-synthesis treatment such that the value of "m" in the composition formula:

$$mR:(Q_wAl_xP_ySi_z)O_2$$

has a value of less than 0.02. The other symbols of the formula are as defined hereinabove. In those preparations in which an alkoxide is employed as the source of element(s) "Q", aluminum, phosphorous and/or silicon, the corresponding alcohol is necessarily present in the reaction mixture since it is a hydrolysis product of the alkoxide. As has been reported repeatedly in the NZMS patent literature, it has not been determined whether this alcohol participates in the syntheses process as a templating agent. For the purposes of this application, however, this alcohol is arbitrarily omitted from the class of templating agents, even if it is present in the as-synthesized QAPSO material.

Since the present intermediate pore structure QAPSO compositions are formed from , $PO_2^+$, $SiO_2$ and $QO_2^n$ framework oxide units which, respectively, has a net charge of $-1$, $+1$, 0 and "n", where "n" is $-3$, $-2$, $-1$, 0 or $+1$, the matter of cation exchangeability is considerably more complicated than in the case of zeolitic molecular sieves in which, ideally, there is a stoichiometric relationship between $AlO_2^-$ tetrahedra and charge-balancing cations. In the instant compositions, an $AlO_2^-$ tetrahedron can be balanced electrically either by association with a $PO_2^+$ tetrahedron or a simple cation such as an alkali metal cation or proton, a cation of the element "Q" present in the reaction mixture, or an organic cation derived from the templating agent. Similarly, an $QO_2^n$ oxide can be balanced electrically by association with $PO_2^+$ tetrhedra, a simple cation such as an alkali metal cation, a cation of the metal "Q", organic cations derived from the templating agent, or other divalent or polyvalent metal cations introduced from an extraneous source.

The QAPSO compositions may exhibit cation-exchange capacity when analyzed using ion-exchange techniques heretofore employed with zeolite aluminosilicates and have pore diameters which are inherent in the lattice structure of each species and which are between about 3Å and 8Å in diameter. Ion exchange of QAPSO compositions will ordinarily be possible only after the organic moiety present as a result of synthesis has been removed from the pore system. Dehydration to remove water present in the as-synthesized QAPSO compositions can usually be accomplished, to some degree at least, in the usual manner without removal of the organic moiety, but the absence of the organic species greatly facilitates adsorption and desorption procedures. The QAPSO materials will have various degrees of hydrothermal and thermal stability, some being quite remarkable in this regard.

The composites of this invention are conveniently formed by the hydrothermal crystallization of one phase in the presence of the other or another. The composite derives from the hydrothermal crystallization of the precursor to the formation of an intended phase in the presence of a deposition substrate which constitutes another phase of the composite. The deposition substrate need not be, in the practice of this invention, a fully formed (e.g., not fully crystallized) composition. Thus, one might initiate the production of a molecular sieve structure by the hydrothermal crystallization procedure, and prior to the fully formed crystal structure, such is utilized as a deposition substrate by the addition thereto of the precursors to be used for the manufacture of an outer layer. In such a case, the deposition substrate is termed to be in the "green" state. There will be instances where one will remove a cation or cations from the deposition substrate after depositing an outer layer thereon. Such cation removal can be effected after the deposition has been completed and a composite structure is formed.

The composites used in the invention do not depend upon the existence of a clear demarcation between the framework composition of one phase and another either during the manufacture of the composite or in the finished composite. As pointed out above, there is often a transformation occurring at the interface of the phases such that the interface could be viewed as constituting a nominal third framework phase of an intended two-phase system or fourth or fifth framework phase of an intended three-phase system. Indeed, one may look at the transition from the framework composition of one phase to another as a gradient compositional change existing between the phases though it is believed that the gradient is primarily differentiable at about the interface with the remainder of the phases being each more homogeneous compositionally. The compositional heterogeneity of the composites of this invention extends in a gross sense by virtue of a difference in the composition of the phases and in the relationship of a phase to the other in respect to the framework composition at the interface.

The hydrocrystallization conditions for synthesizing the composite are those cited above with respect to the specific molecular sieve composition intended for the phase undergoing hydrothermal crystallization. When a preformed molecular sieve is used as a deposition substrate for the intended deposition of a non-zeolitic aluminum and phosphorus based molecular sieve then, of course, the hydrothermal crystallization of reactive aluminophosphate gels should be effected in the presence of the performed molecular sieve. This does not mean that the synthesis will yield a phase which mimics entirely the composition of molecular sieve which is intended by that hydrothermal crystallization synthesis. The compositions that are formed are believed to be different in subtle ways by what transpires at the interface, as indicated above, but similar enough so as to be embraced by the prior characterization of the composition of such a molecular sieve. Preferably, one of the phases, acting as a deposition substrate, is a fully formed crystalline structure. The template may or may not be essentially removed before the composition is subjected to contact with the components which are used to generate the other phase. The deposition substrate is a support for the next produced phase (outer layer) and provides the basis for epitaxial growth. Once one phase is crystallized in the presence of another crystal phase, the composite may be used as the support for the creation of still another solid phase. This procedure may be repeated as many times as desired or as there exists enough molecular sieves of different compositions but having the same crystalline framework to provide a composite of an essentially common crystal structure. By this technique, one may effect a composite having repeated layers of different molecular sieves in an onion skin pattern, except that in the case of the composites of this invention, the skins are chemically bonded to one another. There are occasions where one might wish to blend the ingredients of distinct molecular sieve compositions and effect the hydrothermal crystallization to form a mixed phase composition encompassed by this invention. In the typical case, the composites will be formed by the hydrothermal crystallization of a molecular sieve brew in contact with another but already formed or partially formed crystalline molecular sieve of appropriate crystalline structure.

It is believed that the composite is formed by the epitaxial growth of a crystal onto the surface of the deposition substrate. [It may be the case in some instances that this growth is facilitated by the deposition substrate. Such may be termed a "seeding" effect. However, that would be an insignificant consideration in comparison to the role of the deposition substrate in forming composites having unique and unexpected properties.] The growth in this manner yields a substrate support surface onto which a layer of crystalline molecular sieve is deposited and epitaxially grafts in the process of the hydrothermal crystallization to the crystal framework of the support surface. In this fashion, one may obtain a core surrounded or enveloped by a layer or a film or a mantle of the other molecular sieve(s). Membranes having a differential of exchange properties across the depth of the composite can be made from multi-layers of these films deposited over the core and onto each previously deposited layer. Composites which are multi-faceted in their catalytic performance can be made up of layers each of which has a different catalytic characteristic.

In the examples below are characterizations of the use of composites as octane boosters coming within the invention to enhance the octane rating of gasoline produced by fluid catalytic cracking (FCC). The intermediate pore structure composites, such as intermediate pore structure SAPO deposited on equivalent crystal type intermediate pore structure AlPO4, enhance the ability to raise the octane rating of gasoline when used in very small amounts in conjunction with conventional Y zeolite FCC catalysts or the FCC catalysts based on other composites which are disclosed in copending application Ser. No. 07/058275 (attorney's docket No. D-15,444-1). These composites are combined with the FCC catalysts in a number of different ways, as will be discussed below, as unbonded or bonded particles.

In the preparation examples directed to making the composites useful in the invention, a stainless steel reaction vessel is utilized which is lined with an inert plastic material, polytetrafluorethylene, to avoid contamination of the reaction mixture. In general, the final reaction mixture, from which the composite is crystallized, is prepared by forming mixtures of all of the reagents before adding the deposition substrate, then adding the deposition substrate. Conversely, the deposition substrate may be first added to a reactor and then the reagents for forming the hydrogel which generates the outer lay may be added. Hydrothermal crystallization thereafter follows. There are conditions where the reagents of a phase possess hydrothermal crystallization kinetics which are different from that of the reagents of another phase. In that situation, the reagents can be combined at the same time and the difference in kinetics provides a deposition substrate for crystal growth. In some instances the admixed reagents retain their identity in the intermediate mixture and in other cases some or all of the reagents are involved in chemical reactions to produce new reagents. The term "mixture" is applied in both cases. Further, unless otherwise specified, each intermediate mixture as well as the final reaction mixture was stirred until substantially homogeneous.

As pointed out previously, the composite used in the invention is conveniently achieved in which a deposition substrate acts as a growth site for crystal formation. This may be termed "seeding" but in the context of this invention, the facilitation of crystal formation is not the reason that a deposition substrate is employed in the hydrothermal crystallization of the outer layer. In the typical case, the deposition substrate constitutes the largest phase in the composite. Its role as a composite phase is impacted by the proportion it contributes to the composition of the composite. In other words, the larger the deposition substrate, the more selective is the outer layer up to a point. The evidence establishes that the more selective octane booster catalysts containing the intermediate pore structure NZMSs are those in which the deposition substrate constitutes at least 50 weight percent of the weight of the composite.

The formulation using the composite as octane a boosting catalyst can be effected in many ways. A number of procedures for using octane boosting catalysts are set out in U.S. Pat. Nos. 4,309,279, 4,309,280 and 4,289,606, and in U.S. application Ser. No. 675,279, supra. Those procedure are incorporated herein by reference.

In the simplist utilization of the octane booster catalyst of this invention is to utilize the composite particles per se as the octane boosting catalyst, or as interbonded particles or as intrabonded particles such as to the FCC catalyst. The use of the particles per se is easily accomplished by adding the composite particles to a catalyst blender in the amounts desired for effecting the boosting of the gasoline's octane rating. One problem associated with that technique stems from the difference in size between the FCC catalyst and the composite particles. Care in handling of the blend is necessary to avoid undersirable separation between the composite particles and the FCC catalyst when the blend is transported from the blender through any packing operation and then is supplied to the FCC unit. Intrabonding and interbonding can be effected by a variety of ways. One technique for accomplishing this is to utilize "wet" composite particles. The composite particles can be moistened with distilled or deionized water or a petroleum feedstock prior to blending with the FCC catalyst. This causes the particle to stick to themselves or to the surface of the FCC catalyst, whichever is preferred. However, when doing this for interbonding, one should be careful to incrementally feed the composite particles to the blender and the FCC catalyst already in the blender. Another technique involves the use of the uncalcined composite particles and feeding those in the same manner to a catalyst blender containing the FCC catalyst. Another way of adding the composite particles to the FCC catalyst is to attach a supply of the composite particle catalyst to the riser portion of the cracker and aspirate the particles from the supply in the desired amounts to the cracking reaction. If there is inadequate negative pressure in the riser portion to effect the desired metering of the particles to the cracking reaction, the a positive pressure can be inputted to the supply by feeding a gas which would not adversely affect the cracking reaction or the catalysts to the supply to force the desired amount of the composite particles into the riser and into admixture with the FCC catalyst.

The slurry techniques described in U.S. Pat. No. 4,309,290, in which the octane boosting catalyst is slurried in petroleum feedstock and the slurry is fed to the cracking reaction to provide the desired concentration of the octane boosting catalyst relative to the FCC catalyst or other cracking catalyst, represents another convenient manner for availing oneself of the benefits of the invention.

It is typical to bind the composite by "gluing" together particles of them into predetermined formed catalyst particles using such techniques as spray-drying the composite particles or extruding or pelletizing the composite particles as one desires, using conventional techniques of the catalyst art. As pointed out above, composite particles may be blended with a matrix material, typically one that would be inert to the reactants and product of reaction of the catalytic process, and spray dried, pelletized or extruded into the desired shape. The configuration of the composite of the invention is not critical to the operativeness of this invention, but can be important in respect to a particular FCC operation.

Octane boosting catalyst pellets made from the composite particles are typically a physical blend of the tiny composite particles with an inorganic oxide matrix component which may be any of the inorganic oxide matrix components which have been employed heretofore in the formulation of catalysts including: amorphous catalytic inorganic oxides, e.g., catalytically active silica-aluminas or zeolites such as an amorphous aluminum silicate or a Y zeolite, clays, silicas, aluminas, silica-aluminas, silica-zirconias, silica-magnesias, alumina-borias, alumina-titanias and the like and mixtures thereof. The composite is usually mixed with the matrix component and then formed in the appropriate catalyst shape.

The inorganic oxide matrix components, e.g. aluminas, silicas, clays, etc., may be present in the final catalyst in an amount ranging between about 5 and about 99 weight percent, preferably between about 5 and about 95 weight percent and more preferably between about 10 and about 85 weight percent, based on the total catalyst weight.

The inorganic oxide matrix component may be in the form of a sol, hydrogel or gel and is typically an alumina, silica, clay and/or silica-alumina component such as employed in a conventional silica-alumina catalyst, several types and compositions of which are commercially available. The matrix component may itself provide a catalytic effect or it may be essentially inert. The matrix may act as a "binder" in some instances, although in some instances the final octane boosting catalyst may be spray dried or formed without the need of a binder. These materials may be prepared as a cogel of silica and alumina or as alumina precipitated on a preformed and preaged hydrogel. The silica may be present as a component in the solids present in such gels, e.g., present in an amount between about 5 and about 40 weight percent and preferably between about 10 and about 30 weight percent. Silica may also be employed in the form of a cogel comprising about 75 weight percent silica and about 25 weight percent alumina or comprising about 87 weight percent silica and about 13 weight percent alumina.

The alumina component may comprise discrete particles of various aluminas, e.g., pseudoboehmite. The alumina component may be in the form of discrete particles having a total surface area, as measured by the method of Brunauer, Emmett and Teller (BET), greater than about 20 square meters per gram ($m^2/g$), preferably greater than 145 $m^2/g$, for example, from about 145 to about 300 $m^2/g$. The pore volume of the alumina component is typically greater than 0.35 cc/g. The average particle size of the alumina particles is generally less than 10 microns and preferably less than 3 microns. The alumina may be employed alone as the matrix or composited with the other matrix components such as the silica, as mentioned previously. The alumina component may be any alumina and, preferably, has been preformed and placed in a physical form such that its surface area and pore structure are stabilized. This means that when the alumina is added to an impure, inorganic gel containing considerable amounts of residual soluble salts, the salts will not alter the surface and pore characteristics measurably nor will they promote chemical attack on the preformed porous alumina which could undergo change. For example, the alumina may be an alumina which has been formed by suitable chemical reaction, slurry aged, filtered, dried, washed free of residual salt and then heated to reduce its volatile content to less than about 15 weight percent. Further, an alumina hydrosol or hydrogel or hydrous alumina slurry may be used in the octane boosting catalyst preparation.

Mixtures of the composite particles and the inorganic matrix may be formed into the final form for the octane boosting catalyst by standard catalyst forming techniques including spray-drying, pelleting, extrusion and other suitable conventional means. Such octane boosting catalyst are typically prepared by spray drying, such procedures being well known to those skilled in the art of preparing catalysts.

Illustrative of the procedures for making octane boosting catalysts from the composites of this invention is the following: Sodium silicate is reacted with a solution of aluminum sulfate to form a silica/alumina hydrogel slurry which is then aged to give the desired pore properties, filtered to remove a considerable amount of the extraneous and undesired sodium and sulfate ions and then reslurried in water. The lumina may be prepared by reacting solutions of sodium aluminate and aluminum sulfate under suitable conditions, aging the slurry to give the desired pore properties of the alumina, filtering drying, reslurry in water to remove sodium and sulfate ions and drying to reduce volatile matter content to less than 15 weight percent. The alumina may then be slurried in water and blended in proper amounts, with a slurry of impure silica-alumina hydrogel. The composite molecular sieve may then be added to this blend. A sufficient amount of each component is utilized to give the desired final composition. The resulting mixture is then filtered to remove a portion of the remaining extraneous soluble salts therefrom. The filtered mixture is then dried to produce dried solids. The dried solids are subsequently reslurried in water and washed substantially free of the undesired soluble salts. The octane boosting catalyst is then dried to a residual water content of less than about 15 weight percent. The octane boosting catalyst is typically recovered after calcination.

It is also within the scope of the instant invention to employ other materials in addition to the composite and inorganic oxide matrix components in the final octane boosting catalysts, including various other types of zeolites, clays, carbon monoxide oxidation promoters, etc.

Representative of matrix systems employable herein are disclosed in British patent specification No. 1,315,553, published May 2, 1973 and U.S. Pat. Nos. 3,446,727 and 4,086,187, such being incorporated herein by reference thereto.

It is preferred to employ the composite particle per se as the octane boosting catalyst in combination with the FCC catalyst such as an ultrastable Y or LZ-210 zeolite.

The amount of the octane boosting catalyst used in the FCC process depends upon the desired effect and the performance capabilities of the octane boosting catalyst at different concentrations. The more of the octane boosting catalyst used, the greater the octane rating achieved up to a certain point, which is dependent upon the octane boosting catalyst of choice. Usually, the octane rating of the gasoline goes through a maximum as the concentration of the octane boosting catalyst goes up. In the case of a composite of SAPO-11/AlPO$_4$—11, the highest octane rating with an ultrastable Y as the FCC catalyst is achieved at about 5 weight % of the combined weight of the octane boosting catalyst and the FCC catalyst. However, this is not a limit on the amount of the octane boosting catalyst that may be beneficially employed. Any amount of the octane boosting catalyst which provides for a gain in the octane rating of the gasoline over that generated by the FCC catalyst alone is desirable. In the preferred case, the amount of the octane boosting catalyst that one will desire to employ will be that amount which yields the highest octane rating for the gasoline produced. Overall, the amount of the octane boosting catalyst will not exceed 50 weight % of the total weight of the combined weight of the octane booster and the FCC catalyst. More typical, the octane boosting catalyst will be used in an amount less than about 20 weight percent, more preferably no greater than about 10 weight percent, and most preferably no greater than about 7 weight percent, basis combined weight of the cracking catalyst and boosting catalyst involved in the cracking reaction. In the typical most preferred embodiment, the amount of the octane boosting catalyst provided in the cracking reaction such as FCC cracking, is no greater than about 5 weight percent, same basis. Usually, the octane boosting catalyst will be present in the cracking reaction in an amount of at least about 0.1, preferably at least about 0.5, more preferably at least about 0.7, and most preferably at least about 0.9 weight percent, basis the combined weight of the cracking catalyst such as a FCC catalyst and the octane boosting catalyst involved in the cracking reaction.

The conditions for effecting the cracking reaction are those described in the art for cracking a petroleum fraction to generate a lower boiling material. The temperatures range from about 350° C. (662° F.) to about 700° C. (—1300° F.), with the temperatures specified earlier representing the typical temperature conditions. The pressure of the cracking reaction may range from subatmospheric to superatmospheric pressures. The cracking reaction may be operated batchwise or in a continuous mode, the latter, of course, being favored. The catalytic cracking process can be either fixed bed, moving bed or fluidized bed and the hydrocarbon charge stock may be either concurrent or coutercurrent to the conventional catalyst flow.

The hydrocarbon or petroleum stocks undergoing cracking in according with this invention comprise hydrocarbons generally and, in particular, petroleum fractions having an initial boiling point at atmospheric pressure of at least 200° C. (—390° F.), a 50% point of at least 260° C. (500° F.) at atmospheric pressure and an end point at atmospheric pressure of at least 300° C. (—570° F.). Such hydrocarbon fractions include gas oils, residual oils, cycle stocks, whole top crudes and heavy hydrocarbon fractions derived by the hydrogenation of coal, shale oil, tarr, pitches, asphalts, and the like. It is to be appreciated that the distillation of higher boiling petroleum fractions above about 400° C. (—750° F.) at atmospheric pressure should be carried out under vacuum in order to avoid thermal cracking.

The following examples serve to illustrate specific embodiments of the invention and are not intended to act to limit the scope of the invention.

EXAMPLE 1 a) To a solution of 40.4 grams 85 weight % orthophosphoric acid (H$_3$PO$_4$) in 133 2 grams H$_2$O was slowly added 17.7 grams of di-n-propylamine (DPA) and 18.4 grams of diethanolamine (DEA). The liquids were stirred until miscible and allowed to cool to ambient temperature. Into this solution was mixed 4.8 grams HiSil (precipitated silica, 88 wt. % SiO$_2$, 12 wt % H$_2$O) followed by the admixture of 25.9 grams of hydrated alumina pseudo-boehmite phase, 70 wt. % Al$_2$O$_3$, 30 wt. % H$_2$O). The resulting mixture was blended until homogeneous. The elemental composition of this mixture expressed in molar oxide ratios was: 1.0 DPA : 1.0 DEA : 0.4 SiO$_2$: Al$_2$O$_3$: P$_2$O$_5$: 50 H$_2$O b) 48.4 grams of an as synthesized AlpO4-11 with an elemental composition of:

0.18 DPA : Al$_2$O$_3$: P$_2$O$_5$: 0.8 H$_2$O was ground up gently in a mortar and pestle, then slurried in 100 grams H$_2$O. This AlPO$_4$—11 slurry was added quickly to the mixture of a). An additional 23 grams of H$_2$O was reserved to use in completely transferring all of the AlPO$_4$—11 into the final mixture. The elemental composition of the final mixture expressed in molar oxide ratios was: 0.6 DPA : 0.5 DEA : 0.2 SiO$_2$ Al$_2$O$_3$: P$_2$O$_5$: 45 H$_2$O The final mixture was loaded into a stainless steel pressure vessel equipped for stirring and it was heated to 175° C. over a 2 hour period. The reaction mixture was maintained at 175° C. for 24 hours then cooled. The product was allowed to settle for 72 hours and the supernatant mother liquor was decanted. The solids were resuspended in fresh water and allowed to settle for 1 hour. The cloudy supernatant was decanted and recovered by centrifugation. The settled solids were recovered by filtration.

c) The weights of the recovered products were:

| Solids from supernatant liquid | 57.4 grams |
|---|---|
| Settled solids | 20.3 grams |

There was recovered 29.9 grams of additional material over the 48.4 grams of the starting AlPO$_4$—11. This indicated that the SAPO-11 outer layer was about 38 weight % of the composite structure. X-ray analysis of the two product fractions showed that the settled solids were pure 11-type (SAPO-11 composited on AlPO$_4$—11) and the solids recovered from the supernatant liquid were primarily 11-type (SAPO-11 composited on AlPO$_4$—11) with a trace of the -41 structure-type.

(d). A sample of the settled solids was calcined in air at 500° C. for 16 hours and then tested for n-butane cracking activity as described above. It exhibited a kA of 0.2.

(e) A sample of settled solids exhibited the following elemental analysis, expressed in weight percents:

TABLE G

| Al$_2$O$_3$ | 37.2 |
|---|---|
| P$_2$O$_5$ | 46.5 |
| SiO$_2$ | 1.9 |
| Carbon | 5.3 |
| Nitrogen | 1.0 |
| Loss on Ignition | 13.8 |

(f) A sample of the settled solids was calcined in air at 600° C. for 3 hours. Adsorption capacities were measured on a standard McBain-Baker gravimetric adsorption apparatus following vacuum activation at 350° C., and the following results were obtained:

TABLE H

| Adsorbate | Pressure, torr | Temp. | Weight % |
|---|---|---|---|
| Oxygen | 100 | −183° C. | 9.5 |
| Oxygen | 700 | −183° C. | 12.4 |
| Cyclohexane | 50 | 23° C. | 6.5 | g) Particle size analyses were carried out on the as synthesized $AlPO_4-11$ added to the initial reaction mixture and the settled solids of the SAPO-11/AlPO$_4$-11 composite. The median particle size of the $AlPO_4-11$ was 3.5 microns and the median particle size of the SAPO-11/AlPO$_4$11 composite was 4.8 microns.

EXAMPLE 2

This example shows the manufacture of a composite of an outer layer of SAPO-11 deposited on and enveloping particles of $AlPO_4-11$ as the deposition substrate. An aluminophosphate precursor reaction mixture was prepared by combining 101.2 grams of 85 wt % orthophosphoric acid and 79.5 grams of distilled water, to which was added 69.8 grams of a hydrated aluminum oxide (a psuedo-boehmite phase, 74.4 wt. % $Al_2O_3$, 25.6 wt. % $H_2O$) with high speed stirring to form a homogenous gel. To this gel was added a mixture containing 19.4 grams of fumed silica (92.8 wt. % $SiO_2$, 7.2 wt. % $H_2O$) in 500 grams of a solution of 25.0 wt % tetra-n-butylammonium hydroxide (TBAOH) in methanol. The resulting silicoaluminophosphate gel combination was stirred thoroughly and while stirring 101.2 grams of di-n-propylamine was added. The composition of this reaction mixture in oxide molar ratio was:

gel weight wa approximately 690 grams and at a The total s pH of 9.4. The gel was divided into 5 batches of approximately 137 grams each. Five equal portions of 15 grams each of an uncalcined $AlPO_4-11$ molecular sieve (85% solids, 15% $H_2O$) was added to each 137 grams batch of the SAPO-11 gel. Each batch was then homogenized by stirring and transferred to a 250 cc. polytetrafluoroethylene-lined pipe bomb. The pH (9.5) of each batch of this new deposition substrated gel reaction mixture did not change much. The bombs were placed in an oven already equilibrated at 200° C. and digested for 2, 4, 6 and 24 hours, respectively, with the 6 hour preparation being duplicated. The five bombs were in this manner subjected to a digestion period. After the desired digestion time, each bomb was removed from the oven and allowed to cool to room temperature. The reaction mixture in each bomb was centrifuged to remove the solids and the solids were disbursed in distilled water and centrifuged to remove unreacted materials. This washing procedure was repeated, the washed solids were recovered and dried at 100° C.

The $AlPO_4-11$ which had been added and the composite products produced were analyzed to contain the following components on a solids basis:

TABLE I

| Type | Time of Digestion | WT % | | |
|---|---|---|---|---|
| | | $Al_2O_3$ | $SiO_2$ | $P_2O_5$ |
| AlPO$_4$-11 | — | 41.2 | 0.0 | 58.8 |
| SAPO-11/AlPO$_4$-11 | 2 Hrs | 40.9 | 1.2 | 58.4 |
| SAPO-11/AlPO$_4$-11 | 4 Hrs | 40.2 | 2.0 | 58.3 |
| SAPO-11/AlPO$_4$-11 | 6 Hrs | 40.1 | 2.8 | 57.9 |

TABLE I-continued

| Type | Time of Digestion | WT % | | |
|---|---|---|---|---|
| | | $Al_2O_3$ | $SiO_2$ | $P_2O_5$ |
| SAPO-11/AlPO$_4$-11 | 24 Hrs | 38.5 | 4.6 | 57.2 |

Note the increase in $SiO_2$ content relative to deposition substrate as the time of digestion increased from 2 to 24 hours. This corresponds to the amount of deposition of the SAPO-I1 outer layer on the silica free AlPO$_4$-11 deposition phase.

All products has been subjected to X-ray powder diffraction analysis and found to have the diffraction patterns typical of $AlPO_4-11$ AND SAPO-11.

EXAMPLE 3

The following example compares a blend of Y-82 molecular sieve "reference" FCC cracking catalyst containing 1 weight % of the SAPO-ll/AlPO$_4$-11 composite made according to the procedure of Example 2 above, 6 hour digestion, physically mixed therewith, with a blend of Y-82 molecular sieve "reference" FCC cracking catalyst containing 4 weight % of the SAPO-11, physically mixed therewith. Both blends produced a higher quality gasoline product compared to the Y-82 reference, however, only 1 weight % of the SAPO-11/AlPO$_4$-11 composite was needed to equal the beneficial effects of the 4 weight % of SAPO-11 in the blend.

The reference catalyst contained 18% weight percent Y-82, 62% weight percent kaolin clay and 20% weight percent silica binder and had been extruded to 1/16 inch 0.D. pellets and dried at 110° C. overnight. The catalyst was then ground to 60/100 mesh and calcined at 500° C. for one (I) hour.

The octane boosting catalysts were prepared by physically mixing, on an anhydrous weight percent basis, the SAPO-11/AlPO$_4$-11 composite and SAPO-11 with the Y-82 reference catalyst. Both the composite and SAPO-11 were calcined at 550° C. for two (2) hours before mixing with the Y-82. Each catalyst mixture was then steam treated at 760° C. for two (2) hours in 100% steam and submitted for microactivity testing (MAT). Conditions of the test are described in the ASTM procedure.

Table J below shows the MAT and gasoline analysis results for the three catalysts. The SAPO-11/AlPO$_4$-11 containing catalyst produced a comparable calculated octane boost to that of the SAPO-11 containing catalyst, yet using only one quarter the quantity of octane booster. The calculated boost was about 2 calculated4 RON units resulting from an apparent increase in the aromatic concentration. In both SAPO cases a small gasoline selectivity loss was observed.

[4]A weighted average of the blending octane numbers of all of the gasoline components.

TABLE J

| Catalyst | Y-82 | 4% SAPO-11 | 1% SAPO-11/ AlPO$_4$-11 |
|---|---|---|---|
| % MAT conversion | 63.6 | 63.7 | 61.5 |
| % Gasoline selectivity | 75.4 | 74.9 | 74.2 |
| % Dry Gas Yield | 5.2 | 5.4 | 6.6 |
| % Coke Yield | 2.7 | 2.5 | 2.2 |
| Calculated RON | 89.5 | 91.4 | 92.3 |
| Percent in gasoline | | | |
| Aromatics | 39.0 | 42.8 | 41.6 |
| Paraffins | 35.5 | 34.1 | 32.7 |
| Olefins | 7.7 | 7.2 | 8.4 |

TABLE J-continued

| Catalyst | Y-82 | 4% SAPO-11 | 1% SAPO-11/AlPO$_4$-11 |
|---|---|---|---|
| Naphthenes | 12.1 | 11.1 | 12.7 |
| Iso/Normal Parafins | 8.9 | 8.5 | 8.8 |

Gasoline selectivity = % gasoline yield/(% conversion × .01)

EXAMPLE 4.

This example illustrates the superiority of the SAPO-11/AlPO$_4$-11 composite octane boosting catalyst described in Example 1 above, over SAPO-11 when physically mixed with a Y-82 cracking catalyst at the 1 weight % additive level and subjected to calcination and steaming. The Y-82 catalyst contained 18% Y-82, 62% kaolin clay an 20% silica binder and was prepared by the same method described in Example 3. The catalysts containing the octane boosters were prepared by physically mixing SAPO-11 and SAPO-11/AlPO$_4$-11 in their respective as-synthesized form with 60/100 mesh Y-82 catalyst on a anhydrous basis. The samples were calcined in air for one (1) hour at 500° C. followed by steam treatment for two (2) hours at 760° C. or 790° C. in 100% steam.

Figure 2:
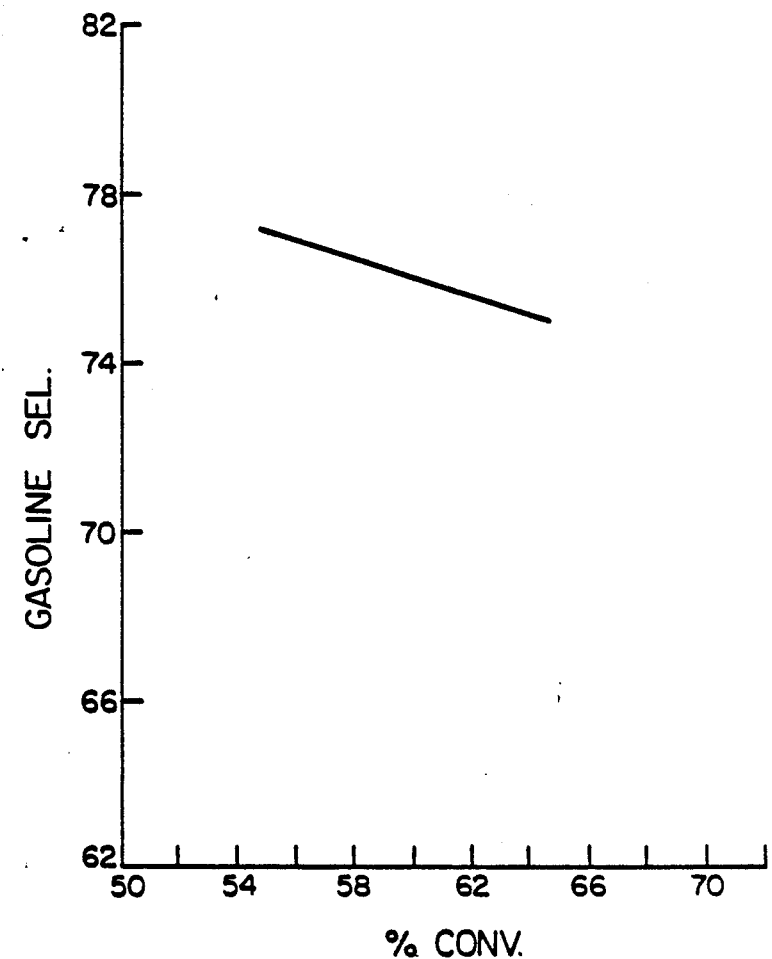
FIG. 2 shows the equivalent performance obtained between the octane boosting catalyst and the conventional NZMS in respect to gasoline selectivity.

The results of the MAT evaluation are listed in Table K below for the 1% SAPO-11 and 1% SAPO-11/AlPO$_4$-11 octane boosted FCC catalysts. FIG. 1 of the Drawings attempts to graphically compare the calculated RON of the gasoline product verses MAT conversion obtained for SAPO-11 physically mixed with Y-82, which constitutes the lower curve, against the calculated RON of the gasoline product verses MAT conversion obtained for the SAPO-11/AlPO$_4$-11 composite octane boosting catalyst physically mixed with Y-82, which constitutes the upper curve. The SAPO-11/AlPO4-11 containing catalysts following steaming demonstrated a substantially higher octane product, about 1-3 calculated RON units over that of the SAPO-11 containing catalysts at a comparable conversion. Comparison of the gasoline selectivity verses MAT conversion shows that the increased RON was obtained with no gasoline selectivity loss. This is reflected in Figure 2 of the Drawings. FIG. 2 shows that both SAPO-11 and the SAPO-11/AlPO$_4$-11 composite octane boosting catalyst physically mixed with Y-82, obtained essentially the same gasoline selectivity vs. MAT conversion. In addition, the catalyst containing the composite in contrast to SAPO-11 per se gave a much superior octane boost after subjection to FCC steaming conditions.

TABLE K

| | SAPO-11 | | SAPO-11/AlPO$_4$-11 | | |
|---|---|---|---|---|---|
| MAT Conversion | 60.8 | 59.9 | 54.8 | 63.2 | 64.6 |
| Octane | 86.9 | 85.6 | 89.8 | 88.0 | 90.5 |
| Gasoline selectivity | 76.0 | 76.0 | 77.2 | 75.0 | 75.4 |
| Temperature of steam treatment | 760° C. | 760° C. | 790° C. | 760° C. | 760° C. |

EXAMPLE 5

This example compares the performance of the SAPO-11/AlPO$_4$-11 composite, prepared by the method of Example 2, six (6) hours digestion, as an octane boosting catalyst at a 1 weight % mixture level in a Y-82 reference catalyst with a zeolitic molecular sieve equivalent to ZSM-5 as an octane boosting catalyst at a 3 weight % mixture level in a Y-82 reference catalyst. Both additives were combined with a Y-82 reference catalyst containing 18% Y-82, 62% kaolin clay and 20% silica binder and prepared as described in Example 3 above. The octane boosting catalysts, i.e., the SAPO-11/AlPO$_4$-11 composite and the zeolitic molecular sieve equivalent to ZSM-5, were calcined at 550° C. for 2 hours prior to being physically blended with the Y-82 reference catalyst, measures on an anhydrous weight basis. All of the blended catalyst samples were steam treated at 790° C. for two (2) hours in 100% steam and submitted for MAT testing.

Listed in Table 3 below are the results of the MAT evaluation and analysis of the gasoline product. Both the 1 % SAPO-11/Alp04-11 and 3 % ZSM-5 type molecular sieve containing catalysts demonstrated substantial boosts in calculated RON over the reference catalyst alone at near comparable MAT conversions. The ZSM-5 type molecular sieve containing catalyst showed a sizable gasoline selectivity loss not observed for the SAPO-11/AlP04-Il containing catalyst. This loss resulted in an undesirable increase in gas production. With both additive containing catalysts there was an increase in aromatics content in the gasoline along with some reduction in the paraffins concentration. The ZSM-5 type molecular sieve containing catalyst showed, however, an undesirable decrease in the iso-/normal ratio in the paraffin fraction compared to the reference catalyst. This was not observed for the SAPO-11/AlPO$_4$-11 containing catalyst. These results demonstrate that the SAPO-11/AlPO$_4$-11 octane booster containing catalyst was able to achieve a similar boost in RON to that found for the ZSM-5 type molecular sieve containing catalyst without the undesirable gasoline selectivity loss.

TABLE L

| Catalyst: | 3% ZSM-5 Type | 1% SAPO-11/AlPO$_4$-11 | Y-82 |
|---|---|---|---|
| % MAT conversion | 59.7 | 58.9 | 60.9 |
| % Gasoline selectivity | 71.1 | 76.2 | 75.5 |
| % Dry Gas Yield | 6.2 | 4.8 | 4.6 |
| % Coke Yield | 2.3 | 2.0 | 2.5 |
| Calculated RON | 92.6 | 92.1 | 88.3 |
| Percent in gasoline | | | |
| Aromatics | 40.6 | 39.2 | 36.1 |
| Parafins | 29.1 | 31.8 | 35.0 |
| Olefins | 10.8 | 11.0 | 9.1 |
| Naphthenes | 12.9 | 12.9 | 13.2 |
| Iso/Normal Parafins | 6.9 | 8.1 | 8.5 |

Gasoline selectivity = % gasoline yield/(% conversion × .01)

We claim:

1. In a process involving the cracking of a petroleum fraction to a lower boiling material by subjecting the petroleum fraction to catalytic cracking conditions in the presence of a petroleum cracking catalyst and an octane boosting catalyst the improvement which comprises employing as the octane boosting catalyst a composite of an intermediate pore non-zeolitic molecular sieve in combination with another NZMS having the same framework structure.

2. The process of claim 1 wherein the cracking is effected by fluidized catalytic cracking.

3. The process of claim 2 wherein the amount of the octane boosting catalyst is not greater than 20 weight % of the combined weight of the petroleum cracking catalyst and the octane boosting catalyst.

4. The process of claim 3 wherein the amount of the octane boosting catalyst is not greater than 10 weight % of the combined weight of the petroleum cracking catalyst and the octane boosting catalyst.

5. The process of claim 4 wherein the amount of the octane boosting catalyst is not greater than 5 weight % of the combined weight of the petroleum cracking catalyst and the octane boosting catalyst.

6. The process of claim 5 wherein the amount of the octane boosting catalyst is not greater than 3 weight % of the combined weight of the petroleum cracking catalyst and the octane boosting catalyst.

7. The processes of claims 1, 2, 3, 4, 5, or 6 wherein one of the intermediate pore NZMSs is an intermediate pore silica alumino phosphate.

8. The process of claims 7 wherein the intermediate pore SAPO is silica alumino phosphate $-11$.

9. The processes of claim 7 wherein the other non-zeolitic molecular sieve having the same framework structure is an intermediate pore $AlPO_4$.

10. The process of claim 8 wherein the other non-zeolitic molecular sieve having the same framework structure is $AlPO_4-11$.

* * * * *